United States Patent

Komma et al.

[11] Patent Number: 5,687,153
[45] Date of Patent: Nov. 11, 1997

[54] OPTICAL HEAD DEVICE AND OPTICAL INFORMATION APPARATUS USING A LITHIUM NIOBATE HOLOGRAM WITH DIVISIONAL AREAS TO DIFFRACT LIGHT TO CORRESPONDING PHOTO DETECTOR AREAS

[75] Inventors: Yoshiaki Komma, Kyoto; Seiji Nishino, Osaka; Shin-ichi Kadowaki, Hirakata; Hiroaki Yamamoto, Katano; Makoto Kato, Nishinomiya; Tetsuo Saimi, Hirakata, all of Japan

[73] Assignee: Matsushita Electric Industrial Co, Ltd., Kadoma, Japan

[21] Appl. No.: 778,508

[22] Filed: Jan. 3, 1997

Related U.S. Application Data

[63] Continuation of Ser. No. 291,400, May 31, 1994, abandoned.

[30] Foreign Application Priority Data

Jun. 2, 1993 [JP] Japan ............................. 5-131785

[51] Int. Cl.$^6$ ........................................ G11B 7/00
[52] U.S. Cl. ..................... 369/110; 369/44.23; 369/112
[58] Field of Search ........................... 369/44.12, 44.23, 369/44.24, 110, 112

[56] References Cited

U.S. PATENT DOCUMENTS

| | | | |
|---|---|---|---|
| 5,013,107 | 5/1991 | Biles | 350/3.7 |
| 5,062,098 | 10/1991 | Hori et al. | 369/112 |
| 5,293,038 | 3/1994 | Kadowaki et al. | 369/44.23 X |
| 5,301,182 | 4/1994 | Komma et al. | 369/44.23 X |
| 5,361,244 | 11/1994 | Nakamura et al. | 369/44.23 |

FOREIGN PATENT DOCUMENTS

| | | |
|---|---|---|
| 0452793 | 10/1991 | European Pat. Off. |
| 0509526 | 10/1992 | European Pat. Off. |
| 63-241735 | 10/1988 | Japan |
| 6462838 | 3/1989 | Japan |
| 1-150244 | 6/1989 | Japan |
| 1-220145 | 9/1989 | Japan |
| 2185722 | 7/1990 | Japan |
| 4212730 | 8/1992 | Japan |

Primary Examiner—W. R. Young
Attorney, Agent, or Firm—Renner, Otto, Boisselle & Sklar

[57] ABSTRACT

An optical head device includes: a light source for emitting a light beam; an objective lens for converging the light beam on an information storage medium; a hologram for receiving the light beam reflected by the information storage medium and generating diffracted light from the light beam, the hologram having such a polarization anisotropy that it diffracts light in a second polarization state more strongly than light in a first polarization state which is different from the second polarization state; and a photodetector including a plurality of photodetective sections for receiving a part of the diffracted light and outputting a photocurrent in accordance with the intensity of the part of the diffracted light. The optical head device further include a quarter-wave plate disposed between the objective lens and the hologram for causing the polarization state of the light beam reflected by the information storage medium to be the second polarization state; and the hologram is disposed so that the distance between the hologram and the objective lens is shorter than the distance between the hologram and the photodetector.

11 Claims, 19 Drawing Sheets

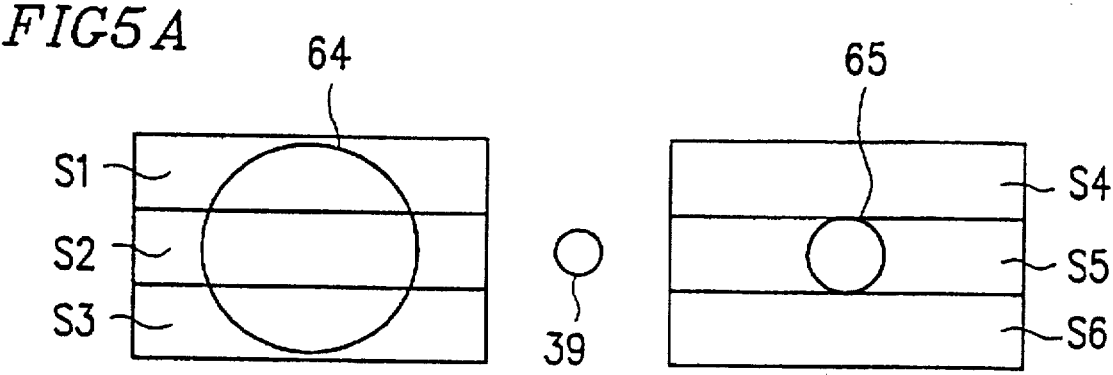
FIG. 5A
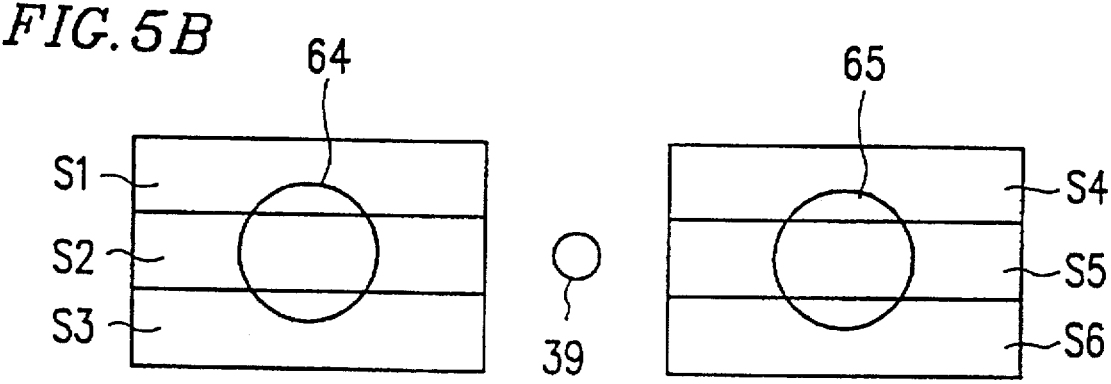
FIG. 5B
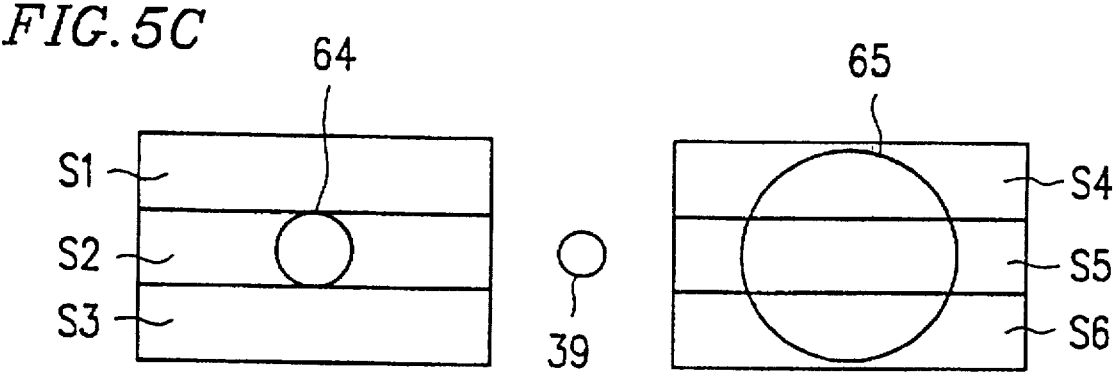
FIG. 5C
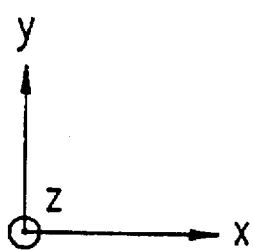

OPTICAL HEAD DEVICE AND OPTICAL INFORMATION APPARATUS USING A LITHIUM NIOBATE HOLOGRAM WITH DIVISIONAL AREAS TO DIFFRACT LIGHT TO CORRESPONDING PHOTO DETECTOR AREAS

This is a continuation of application Ser. No. 08/251,400 filed on May 31, 1994, now abandoned.

BACKGROUND OF THE INVENTION

1. Field of the Invention

The present invention relates to an optical head device for performing recording/reproduction or erasing data from information storage media such as optical storage media including optical disks and optical cards and magneto-optical storage media. Also, the invention relates to an optical information apparatus using the optical head device.

2. Description of the Related Art

In the field of optical memory techniques, an optical disk having a pit-like pattern is used as an information storage medium with a high storage density and a large storage capacity. Recently, these optical memory techniques have been into practical use and the range of uses is increasing such as digital audio disks, video disks, document filing disks and data files.

The recording/reproduction of data onto and from the optical disk is performed using a light beam focused on a minute spot. In performing this recording/reproduction of data with a high reliability, the configuration of an optical system has an important role. The optical head device is one of the main components of the optical system. The basic functions of the optical head device can be largely categorized into: a convergence of light for forming the minute light spot at the diffraction limit, the focus control and tracking control of the light beam and the detection of a pit signal. These functions are realized by combining various kinds of optical elements and optical signal detection methods differently in accordance with the desired form and purpose of use.

In order to make the optical head device more compact and thinner, an optical head device using a hologram has been under development. The inventors of the present invention have directed their attention to the hologram as a thin, light and flat-type optical element and invented an optical head device in which the hologram and an objective lens are integrally provided as one unit (see Japanese Laid-Open Patent Publication No. 4-212730). This optical head device will be described hereinafter with reference to FIGS. 14 through 19.

FIG. 14 shows a blazed hologram 1 and a light source 2 such as e semiconductor laser. This optical head device is characterized by disposing the blazed hologram 1 so as to be close to an objective lens 4. The operation of the device will be described hereinafter.

A light beam 3 (laser beam) emitted from the light source 2, after passing through the blazed hologram 1, is incident upon the objective lens 4 and is focused on an information storage medium 5. The light beam reflected by the information storage medium 5 travels along the optical path backwardly and is incident upon the blazed hologram 1 again. The light beam reflected by the storage medium 5 is diffracted by the blazed hologram 1, and thereby a plus first-order diffracted light 6 is generated. A photodetector 7 receives the plus first-order diffracted light 6 and outputs an electric signal in accordance with the intensity of the light. By calculating the output from the photodetector 7, a servo signal and a data signal are obtained.

If the hologram 1 is not blazed, as shown in FIG. 15, on the outgoing path (through which the light beam travels from the light source 2 to the information storage medium 5), an unnecessary diffracted light (e.g., the minus first-order diffracted light 8 on the outgoing path) generated by the hologram 1 is incident upon the photodetector 7 after reflection by the information storage medium 5 as the zero-order diffracted light 81 on the return path (through which the reflected light beam returns from the information storage medium 5 toward the direction of the light source 2). In the optical head device, the incident amount of unnecessary light upon the photodetector 7 which becomes noises in the servo and data signals is significantly reduced, though the hologram 1 is disposed in the vicinity of the objective lens 4 and the photodetector 7 and the light source 2 are located close to each other.

FIGS. 16A, 16B and 16C show an exemplary fabrication procedure of a blazed hologram 102. After the portions marked with oblique lines in FIG. 16A are etched, the portions marked with oblique lines in FIG. 16B are etched. Then, a blazed hologram is obtained by etching the portions marked with oblique lines in FIG. 16C.

An example of the method for detecting the focus servo signal is the spot size detection method (SSD method). As disclosed in the Japanese Laid-Open Patent Publication No. 2-185722, by using the SSD method, the allowable error in the assembly of the optical head device is significantly increased. In addition, the SSD method allows the servo signal to be stably obtained against wavelength fluctuations.

In order to realize this SSD method, the plus first-order diffracted light on the return path from the hologram should be designed to be two kinds of spherical wave each having different curvatures. The spherical waves have focus points e and f, in the front and rear of the photodetector face, respectively. As shown by FIGS. 17A, 17B and 17C, the plus first-order diffracted lights 141 and 142 on the return path are received by a 6-divided photodetector 71.

As shown in FIGS. 17A through 17C, the left-hand portion of the photodetector consists of three photoelectric conversion sections S10, S20 and S30 for receiving the plus first-order diffracted light 141, and the right-hand portion of the photodetector consists of three photoelectric conversion sections S40, S50 and S60 for receiving the plus first-order diffracted light 142. FIG. 17B shows a just focus condition, and FIGS. 17A and 17C show defocus conditions. A focus error signal FE is obtained by the following calculation.

$$FE=(S10+S+-S20)-(S40+S60-S50) \quad (1)$$

Even when using the SSD method, by providing the hologram with a blaze configuration, the light can be used more efficiently and the S/N ratio is improved. FIG. 18 shows an example of realizing a blazed hologram using SSD method. In FIG. 18, an A-region 151 generates the spherical wave having a focus point in front of the photodetector and a B-region 152 generates the spherical wave having a focus point in the rear of the photodetector. As shown in FIG. 17, there are missing parts in the far field pattern of the wave surface diffracted from the hologram pattern shown by FIG. 18, which reflect the divided shape of the hologram pattern. However, this does not affect the servo signal.

Moreover, as shown by FIG. 19, diffraction areas 153 and 154 are provided on the hologram 104 so that the variances of the light amount distribution on the hologram due to change of the positional relationship between the focused beam spot and the tracking groove on the information storage medium 5 is picked up as a tracking error signal TE. The diffracted light 163 for detecting the tracking error signal, generated from the diffraction area 153 or 154 is received by a photodetector 72 for tracking error signal detection. The tracking error signal TE is obtained by the calculation expressed by the following Equation 2:

$$TE = S70 - S80 \qquad (2)$$

The following effects are obtained by the above-mentioned configuration.

(1) By blazing the hologram, diffraction efficiencies of the zero-order diffracted light on the outgoing path and the plus first order diffracted light on the return path are made larger. As a result, the light can be used more efficiently, which results in enhancement of the S/N ratios of the servo signal, the data signal, etc.

(2) Diffracted lights are generated on the outgoing path from the light source to the information storage medium in the optical path. The amount of diffracted light which is incident upon the photodetector except for the zero-order diffracted light on the outgoing path is suppressed by means of the optimum design of the cross-sectional shape of the blazed hologram. In this way, the deterioration of the data signal, servo signal or the like can be avoided without expanding the angle of diffraction and thereby preventing unnecessary diffracted light from being incident upon the photodetector. Accordingly, if the optical head device is constructed using this blazed hologram, the photodetector and the light source can be disposed close to each other, and at the same time, the effective aperture R1 of the blazed hologram 1 can be increased. Therefore, the positional allowable errors of the positioning at the time of assembly can be alleviated.

(3) By employing the configuration in which the blazed hologram and the objective lens are integrated as one unit, the diffracted light generated on the outgoing path by the hologram does not move on the photodetector, regardless of the movement of the objective lens caused by the tracking follow. Accordingly, the focus error signal is stably obtained simultaneously with the tracking follow. Furthermore, since the hologram is blazed, the diffraction efficiency of unnecessary diffracted light such as the minus first-order diffracted light on the outgoing path is smaller than that of the plus first-order diffracted light on the return path or the zero-order diffracted light on the outgoing path. In this way, the deterioration of the servo signal or the data signal, caused by the unnecessary diffracted light such as the minus first-order diffracted light on the outgoing path, is significantly minimized. Thus, very stable reading of the servo and the data is realized.

(4) By using the SSD method as a method of detecting the focus servo signal, an optical head device whose allowable errors at the time of assembly are much larger can be structured. Also, by dividing the hologram pattern and making the spherical waves with different curvatures generated from the two kinds of area as the plus first-order diffracted light, both of the blazing of the hologram and the SSD method can be easily realized. Accordingly, the allowable error of the optical head device during assembly can be considerably increased, and at the same time, the optical head device allowing to obtain a signal having an excellent S/N ratio can be constructed.

However, the above configurations have the following problems.

(1) The diffraction efficiency of unnecessary diffracted light such as the minus first-order diffracted light on the outgoing path is smaller than that of the plus first-order diffracted light on the return path or the zero-order diffracted light on the outgoing path. However, the diffraction efficiency can not be zero. There is a possibility that the servo signal or the data signal with higher quality can be obtained by further reducing the unnecessary diffraction efficiency so as to be close to zero. Especially, it is important to obtain the servo signal or the data signal of much higher quality in the optical head device such as an optical disk with a higher density than that of a compact disk now commercially available, which is realized by reducing the unnecessary diffraction efficiency so as to be close to zero.

(2) The efficiency with which light is used is certainly improved by the blazing. However, the efficiency with which the light beam is used on the forward and return paths in the course of passing through the hologram is 20% at most. There is a possibility that the noise margin can be further enhanced by further raising the efficiency of using light.

(3) The diffraction efficiency of the diffracted light of each order on the outgoing path is the same as that on the return path. On the outgoing path, the diffraction efficiency (transmittance) of the zero-order diffracted light (transmitted light) is required to be as large as possible. Thus, the diffraction efficiency of the zero-order diffracted light also becomes large on The return path. Accordingly, the return light to the light source exists. When assuming that the diffraction efficiency of the zero-order diffracted light is 30%, the light amount of the return light is 30%×30%×9%. When a semiconductor laser is used as the light source, this return light amount may increase the laser noise.

The present invention is addressed to the above-mentioned problems, and one objective thereof is to provide an optical head device with a high efficiency of using light.

Another objective of the present invention is to provide an optical head device in which the return light to the light source is little and unnecessary diffracted light is not likely to occur.

Still another objective of the present invention is to provide an optical head device whereby a stable signal can be obtained.

Still another objective of the present invention is to provide an optical information apparatus with such an optical head device.

SUMMARY OF THE INVENTION

An optical head device according to the present invention includes: a light source for emitting a light beam; an objective lens for converging the light beam on an information storage medium; a hologram for receiving the light beam reflected by the information storage medium and generating diffracted light from the light beam, the hologram having such a polarization anisotropy that diffracts light in a second polarization state more strongly than light in a first polarization state which is different from the second polarization state; and a photodetector including a plurality of photodetective sections for receiving a part of the diffracted light and outputting a photo-current in accordance with the intensity of the part of the diffracted light; wherein the optical head device further includes an optical means disposed between the objective lens and the hologram for causing the polarization state of the light beam reflected by the information storage medium to be the second polarization state; and the hologram is disposed so that a distance between the hologram and the objective lens is shorter than the distance between the hologram and the photodetector.

In one embodiment of the invention, the relative positional relationship between the hologram and the objective lens is fixed.

In another embodiment of the invention, the first polarization state is a linearly polarized state of which direction of polarization is parallel to a first direction; and the second polarization state is a linearly polarized state of which direction of polarization is perpendicular to the first direction.

In still another embodiment of the invention, the optical means is a quarter-wave plate for converting the first polarization state to a circularly polarization state and converting the circularly polarization state to the second polarization state.

In still another embodiment of the invention, the light source emits light in the first polarization state.

In still another embodiment of the invention, the optical head device further includes another optical means for causing the light emitted from the light source to be in the first polarization state.

In still another embodiment of the invention, the light source is a semiconductor laser.

In still another embodiment of the invention, the hologram has a lithium niobate substrate, proton-exchanged layers periodically formed on a surface of the substrate and grooves formed over upper portions of the proton-exchanged layers.

In still another embodiment of the invention, the relative positional relationship among the hologram, the objective lens and the optical means is fixed.

In still another embodiment of the invention, the diffracted light generated by the hologram includes a first spherical wave having a focal point before a detection face of the photodetector and a second spherical wave having a focal point beyond the detection face.

In still another embodiment of the invention, the hologram face of the hologram includes divisional areas H1 and H2; the plurality of photodetective sections include a photodetector area P1 and a photodetector area P2 which are provided on the detection face; the photodetector area P1 receives diffracted light diffracted by the divisional area H1 of the hologram and outputs an output signal E1 in accordance with an intensity of the diffracted light; the photodetector area P2 receives diffracted light diffracted by the divisional area H2 of the hologram and outputs an output signal E2 in accordance with the intensity of the diffracted light; and obtained based on the output signal E1 and the output signal E2.

In still another embodiment of the invention, a hologram face of the hologram includes divisional areas H1 and H2; the plurality of photodetective sections include a photodetector area P1 and a photodetector area P2 which are provided on the detection face; the photodetector area P1 receives diffracted light diffracted by the divisional area H1 of the hologram and outputs an output signal E1 in accordance with an intensity of the diffracted light; the photodetector area P2 receives diffracted light diffracted by the divisional area H2 of the hologram and outputs an output signal E2 in accordance with the intensity of the diffracted light; and a signal indicative of the deviation amount of pit position with respect to a track center of the information storage medium is obtained based on the output signal E1 and the output signal E2.

In still another embodiment of the invention, the divisional areas H1 and H2 on the hologram face are symmetric with respect to a symmetry axis therebetween; and both of the symmetry axis and the direction of the light beam traveling from the light source to the mirror coincide with track direction of the information storage medium.

In still another embodiment of the invention, the optical head device further includes a substrate for holding the plurality of photodetective sections integrally as one unit, and the substrate provides a concave portion having a bottom and a side wall slope; the light source is provided at the bottom of the concave portion; and a mirror for reflecting the light beam emitted from the light source in the direction perpendicular to the surface of the substrate is provided on the side wall slope.

In still another embodiment of the invention, the optical head device further includes a beam splitter for passing the light in the first polarization state and reflecting the light in the second polarization state, disposed between the light source and the hologram, wherein; a part of the light beam reflected by the information storage medium is introduced through the beam splitter to the photodetector, after being diffracted by the hologram.

According to another aspect of the invention, an optical information apparatus provided with an information storage medium drive means for driving an information storage medium, an optical head device and an optical head drive means for adjusting the positional relationship between the information storage medium and the optical head device, the optical head device includes: a light source for emitting a light beam; an objective lens for converging the light beam on the information storage medium; a hologram for receiving the light beam reflected by the information storage medium and generating diffracted light from the light beam, the hologram having such a polarization anisotropy that diffracts light in a second polarization state more strongly than light in a first polarization state which is different from the second polarization state; a photodetector including a plurality of photodetective sections for receiving a part of the diffracted light and outputting a photocurrent in accordance with the intensity of the part of the diffracted light; and an optical means disposed between the objective lens and the hologram for causing the polarization state of the light beam reflected by the information storage medium to be the second polarization state; the hologram being disposed so that the distance between the hologram and the objective lens is shorter than the distance between the hologram and the photodetector, and the relative positional relationship between the hologram and the objective lens being fixed to be a specific relationship.

Thus, the invention described herein makes possible the advantages of (1) providing an optical head device in which unnecessary diffraction does not occur on the outgoing path and a diffracted light beam for obtaining the servo signal or the like is generated on the return path because the polarization anisotoropic hologram and an optical element (a quarter-wave plate) are used in combination, the device allowing to obtain a signal with very high S/N ratio without noise due to unnecessary diffracted light beam, (2) providing an optical head device in which the light can be used very efficiently and the amplitude of the signal is large, which allows it to obtain a signal with very high S/N ratio and (3) providing an optical head device in which a high extinction ratio is obtainable and further, the light amount of return light to the light source can be approximately zero since the first-order diffraction efficiency on the return path can be very high while the zero-order diffraction efficiency is approximately zero, which allows the avoidance of the occurrence of noise due to the return light in the case of using a semiconductor laser as the light source.

These and other advantages of the present invention will become apparent to those skilled in the art upon reading and understanding the following detailed description with reference to the accompanying figures.

BRIEF DESCRIPTION OF THE DRAWINGS

FIGS. 5A through 5C are plan views showing the diffracted lights incident upon photodetective sections.

DESCRIPTION OF THE PREFERRED EMBODIMENTS

EXAMPLE 1

An optical head device of the present invention is described with reference to the accompanying figures. The directions of the x, y and z axes are in accordance with those of FIGS. 3, 4B, 5 through 7, 9 and 10.

Figure 1:
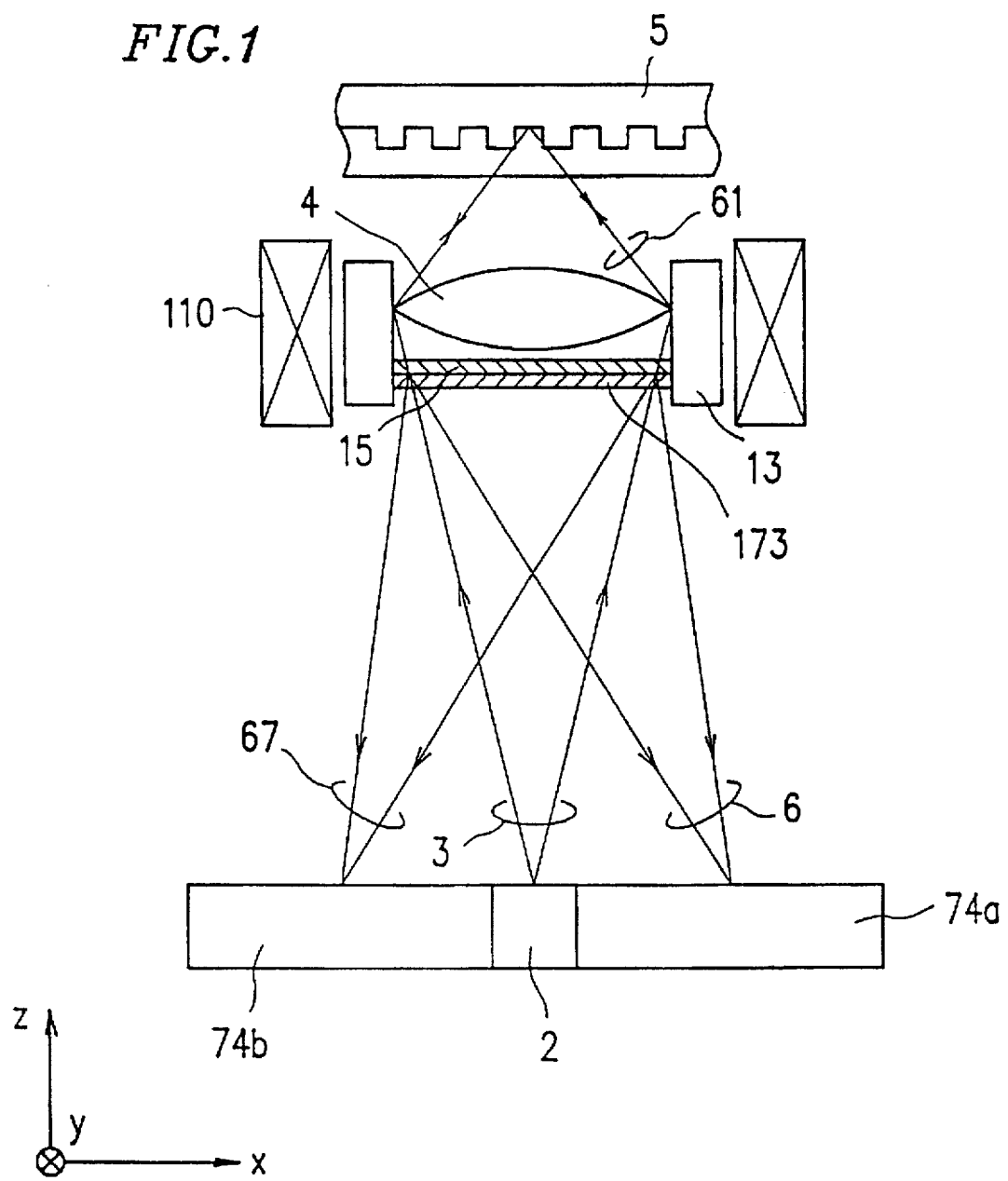
FIG. 1 is a schematic cross-sectional view showing an optical head device of the present invention.

As shown in FIG. 1, the optical head device of Example 1 includes a light source (semiconductor laser) 2 for emitting a light beam (laser beam) 3, an objective lens 4 for converging the light beam 3 on an information storage medium 5, a polarization anisotropic hologram 173 and a photode-tector or including a plurality of photodetective sections 74a and 74b. The polarization anisotropic hologram 173 receives the light beam 3 reflected by the information storage medium 5 to form diffracted light from the light beam 3. The photodetector receives part of the diffracted light (diffracted rays 6 and 67) and outputs a photoelectric current in accordance with the intensity of the light.

As described in detail later, the polarization anisotropic hologram 173 of this example diffracts more light beams linearly polarized in one direction (the first direction) than light beams linearly polarized in the direction perpendicular thereto (the second direction). More specifically, the polarization anisotropic hologram 173 is adjusted so as not to substantially diffract the light beam 3 when receiving the light beam 3 emitted from the light source 2 and transmitting it toward the information storage medium 5. However, the polarization anisotropic hologram 173 is adjusted to diffract the light beam 3 reflected by the information storage medium 5 on receiving and transmitting it toward the light source 2. In this sense, the polarization anisotropic hologram 173 has a function also as an element for separating polarized light. Various information can be obtained by detecting the diffracted light generated by the polarization anisotropic hologram 173, using the photodetective sections 74a and 74b.

It is preferable that this polarization anisotropic hologram 173 is located between the objective lens 4 and the photodetective sections 74a and 74b so as to be nearer to the objective lens 4 than to the photodetective section 74a. The reason for this arrangement will be described later. In Example 1, the distance between the polarization anisotropic hologram 173 and the objective lens 4 is 3 mm, while the distance between the polarization anisotropic hologram 173 and the photodetective section 74a is 20 mm.

In addition to the polarization anisotropic hologram 173, the optical head device of Example 1 further includes an optical means (a quarter-wave plate 15) for adjusting the polarization state of the light beam 3. In this example, the quarter-wave plate 15 is located between the information storage medium 5 and the polarization anisotropic hologram 173, more specifically, between the objective lens 4 and the polarization anisotropic hologram 173. However, this quarter-wave plate 15 is not necessarily required to be located between the objective lens 4 and the polarization anisotropic hologram 173. The objective lens 4 and the quarter-wave plate 15 are supported so as to be close to each other. This arrangement facilitates optical alignment of these two elements. Furthermore, they are integrally provided as one unit, and the effect that they are not likely to shift from each other is obtained.

The objective lens 4, the polarization anisotropic hologram 173 and the quarter-wave plate 15 are supported by a supporting member 13 integrally as one unit. A drive means 110 adjusts the positional relationship between the objective lens 4 and the information storage medium 5 by directly driving this supporting member 13. The outputs from the photodetective sections 74a and 74b are supplied to a known control circuit (not shown) to control the drive of the drive means.

The respective components of the optical head device of Example 1 will be described in more detail.

First, the light beam 3 emitted from the light source (semiconductor laser) 2 is substantially linearly polarized in the direction parallel to an active layer (not shown) of the semiconductor laser. After being transmitted through the polarization anisotropic hologram 173 and the quarter-wave plate 15, the light beam 3 is incident Upon the objective lens 4 and converged on the information storage medium 5 (on the outgoing path). In this way the light beam 3, which is linearly polarized when emitted from the light source 2, is circularly polarized by being transmitted through the quarter-wave plate 15. Moreover, instead of a semiconductor laser or the like which emits light linearly polarized in a specific direction, a light source which emits light having a plurality of polarized light components may be used. Between the light source and the polarization anisotropic hologram 173, a polarized light filter for selectively transmitting a part of light which is linearly polarized in the specific direction, so that the light components other than those linearly polarized in the specific direction may be removed. In such a case, a light source capable of emitting light with high intensity is used so that sufficient amount of light is assured after the removal of components. Alternatively, the linearly polarized light beam 3 from the light source 2 may be incident upon the polarization anisotropic hologram 173, after its plane of polarization is rotated through a necessary angle.

When the light beam 3 is incident upon the polarization anisotropic hologram 173, its angle of polarization is set in such a direction that the light beam 3 is not substantially diffracted by the polarization anisotropic hologram 173. This arrangement will be described later in connection with the description of the polarization anisotropic hologram 173.

The light beam 3 reflected by the information storage medium 5 travels back along the optical path which it has traveled. That is, the reflected light beam 3 is incident upon the polarization anisotropic hologram 173 after passing through the quarter-wave plate 15 again. This light beam 3 is returned to the original condition, i.e., linearly polarized light, by passing through the quarter-wave plate 15. At that time, the direction of polarization of the light beam 3 is at right angles to that of the light beam 3 which has just been emitted from the light source 2. The polarization anisotropic hologram 173 diffracts a light beam which has passed through the objective lens 4. As a result, among from the diffracted light formed by the polarization anisotropic hologram 173, plus first-order diffracted beam 6 and the minus first-order diffracted beam 67 are respectively incident upon the photodetective sections 74a and 74b. The photodetective sections 74a and 74b output electric signals in accordance with the intensities of the plus first-order diffracted beam 6 and the minus first-order diffracted beam 67. The servo signal and the data signal are obtained by calculating the output of each of the photodetective sections 74a and 74b.

In Example 1, since the polarization anisotropic hologram 173 and the quarter-wave plate 15 are used in combination, at least the following effects are attained.

(1) In the outgoing path of the light beam, unnecessary diffraction by the polarization anisotropic hologram does not occur. In the return path, the diffracted light for generating the servo signal and the like can be obtained by the polarization anisotropic hologram. As a result, noise resulting from the unnecessary diffracted light is obviated, which allows the optical head device to obtain a signal with an excellent S/N ratio. In addition, the light can be highly efficiently used, and the amplitude of the signal is large. For use in an optical disk with a higher storage density than that of the commercially available compact disks or the like, there are strong demands that the diffraction efficiency of the unnecessary diffracted light is further lowered so as to be close to 0. The optical head device of this example allows it to obtain a servo signal, data signal or the like with a sufficiently high quality for satisfying these demands.

(2) In this example, the first-order diffraction efficiency of the light beam in the return path is enhanced, while the zero-order diffraction efficiency (transmittance) is about 0. Accordingly, the amount of return light to the light source 2 can be made about 0. In the case of using a semiconductor laser as the light source 2, the oscillation mode of the semiconductor laser becomes unstable due to the return light, which may cause the noise. However, by using the optical head device of this example, occurrence of noise resulting from the return light can be prevented.

Alternatively, a Faraday rotator may be used in place of the quarter-wave plate as an optical element for adjusting the polarization state of the light beam. In the case of using the Faraday rotator, the direction of polarization of light beam transmitted through the hologram is subject to the rotation by 45 degrees. Then, on the reverse optical path (return path), its direction of polarization is further rotated by 45 degrees. As a result, when the light beam is incident upon the hologram, its direction of polarization becomes perpendicular to the original direction. Accordingly, the diffraction of plus/minus first order diffracted lights occurs, and thus the optical head device with a high efficiency of using light and capable of obtaining a signal with high S/N ratio can be constructed. As widely known, this Faraday rotator can be easily realized, for example, by combining bismuth substituted rare earth garnet and a magnet.

Now, main structural components of the optical head device of this example and the signal detection method using the device are described in detail.

Polarization Anisotropic Hologram

Figure 2:
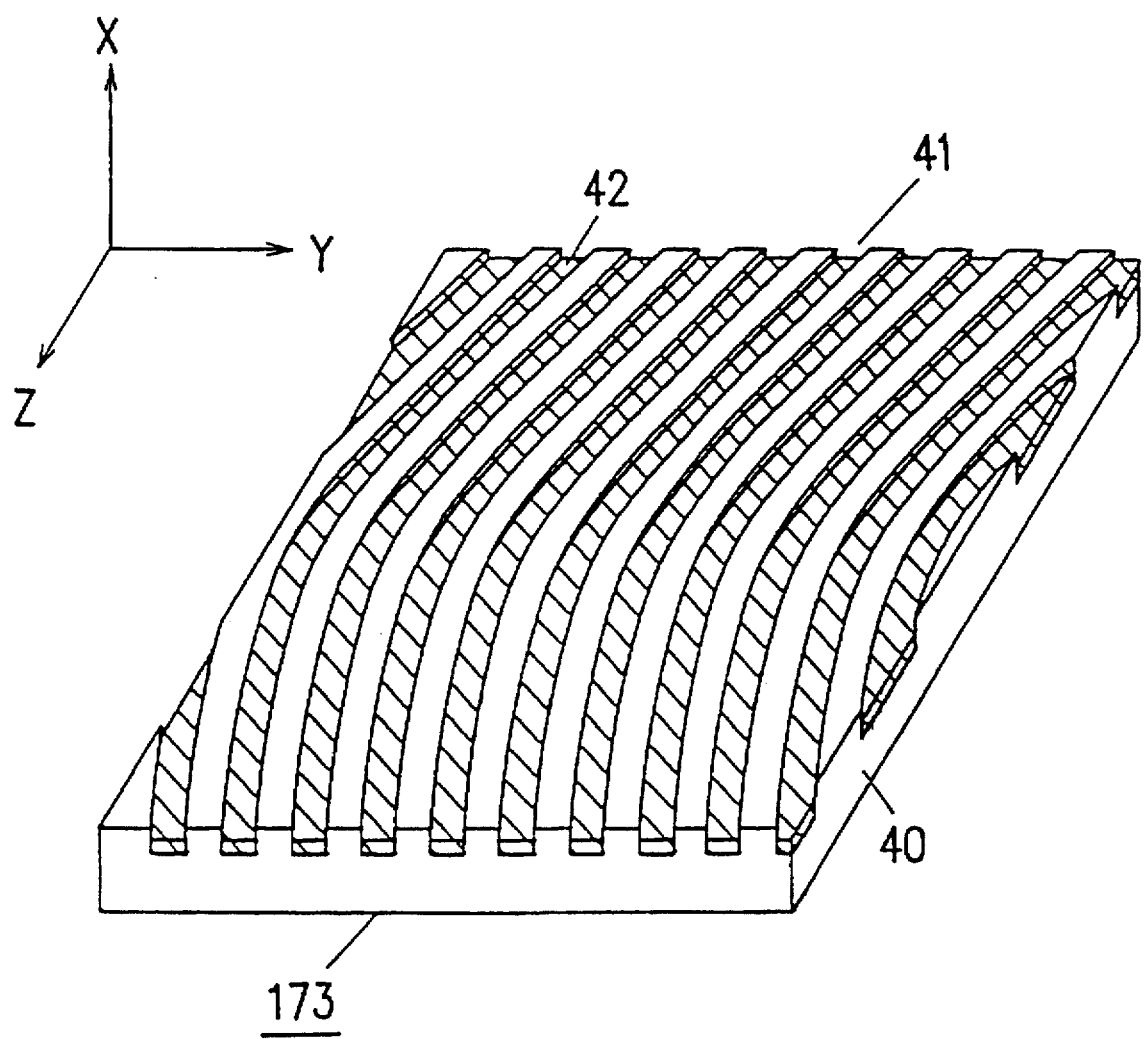
FIGS. 2 is a perspective view, partly in cross-section, showing a polarization anisotropic hologram of a first example of the present invention.

FIG. 2 is a perspective view showing polarization anisotropic hologram 173 used in Example 1 of the present invention. The directions of x, y, and z axes in FIG. 2 are not in accordance with those in other figures including FIG. 1.

This polarization anisotropic hologram 173 is fabricated in the following manner. First, a proton-exchanged layers (depth: dp) 41 are periodically formed on the x-plane surface of the lithium niobate substrate 40. Thereafter, only the surface of the proton-exchanged layers 41 is selectively etched and whereby the grooves 42 are formed.

Where $n_o$ is the refractive index of the lithium niobate substrate 40 with respect to ordinary light, $n_{ep}$ is the refractive index with respect to extraordinary light, $n_{op}$ is the refractive index of the proton-exchanged layer 41 with respect to ordinary light and n ep is that with respect to extraordinary light, the difference $\Delta n_o$ between the lithium niobate substrate 40 and the proton-exchanged layer 41 in refractive index with respect to ordinary light and the difference $\Delta n_e$ therebetween in refractive index with respect to extraordinary light are expressed by the following Equations (3) and (4).

$$\Delta n_o = n_{op} - n_o \quad (3)$$

$$\Delta n_e = n_{ep} - n_e \quad (4)$$

The refractive index with respect to light whose wavelength is 0.78 μm has a relationship between the lithium niobate substrate 40 and the proton exchanged layer 41, as follows:

$$\Delta n_o = -0.04$$

$$\Delta n_e = 0.145$$

The polarization anisotropic hologram 173 of this Example 1 utilizes the difference of refractive index between ordinary light and extraordinary light. The groove 42 formed on the surface of the proton-exchanged layer 41 has a function of offsetting the change of the refractive index of the extraordinary light. In other words, it is configured so that there is no difference of optical path with respect to the extraordinary light.

The functions of the polarization anisotropic hologram 173 will be described hereinafter.

First, the case where ordinary light (light having an electric field vector parallel to the direction of the y-axis of crystal) is incident upon the polarization anisotropic hologram 173 will be considered. The phase of light which does not pass through the proton-exchanged layer 41 (i.e., passing through only the lithium niobate substrate 40) is regarded as a standard. Since the refractive indexes of the proton-exchanged layer 41 and the groove 42 are smaller than that of the lithium niobate substrate 40, the advancement of phase arises in the light passing through this region. Where the advancement of phase is expressed by the negative and the delay of phase is expressed by the positive, the change amount of phase, $\Delta\phi_o$, is given by the following Equation 5.

$$\Delta\phi_o = (2\pi/\lambda)(\Delta n_o \times dp + \Delta n_{oa} \times da) \tag{5}$$

Here, $\lambda$ is the wavelength of the incident light, and $\Delta n_{oa}$ is the difference between $n_o$ (the refractive index of the substrate with respect to ordinary light) and I (the refractive index of air), and is given by the following Equation 6.

$$\Delta n_{oa} = I - n_o \tag{6}$$

On the other hand, the case where extraordinary light (light having an electric field vector parallel to the direction of the z-axis of crystal) is incident upon the polarization anisotropic hologram 173 will be considered. The phase of light which does not pass through the proton-exchanged layer 41 (i.e., passing through only the lithium niobate substrate 40) is regarded as a standard. Since the refractive index of the groove 42 is smaller than that of the lithium niobate substrate 40, the advancement of phase arises in the light passing through this region. Meanwhile, since the refractive index of the proton-exchanged layer 41 is larger than that of the lithium niobate substrate 40, the delay of phase arises in the light passing through this region and the advancement of phase caused by the groove 42 is canceled by the delay. Where the advancement of phase is expressed by the negative and the delay of phase is expressed by the positive, the change amount of phase, $\Delta\phi_e$, is given by the following Equation 7.

$$\Delta\phi_e = (2\pi/\lambda)(\Delta n_e \times dp + \Delta n_{ea} \times da) \tag{7}$$

Here, $\lambda$ is the wavelength of the incident light, and a $\Delta n_{ea}$ is the difference between $n_e$ (the refractive index of the substrate with respect to extraordinary light) and I (the refractive index of air), and is given by the following Equation 8.

$$\Delta n_{ea} = I - n_e \tag{8}$$

Thus, the polarization anisotropic hologram 173 has the function of diffracting ordinary light and not diffracting extraordinary light. That is, this function is attained by properly selecting the depth dp of the proton-exchanged layer 41 and the depth da of the groove 42 so that the phase difference $\Delta_e$ of the extraordinary light is an integral multiple of $2\pi$ and the phase difference $\Delta\phi_o$ of the ordinary light is not an integral multiple of $2\pi$. Especially, if $\Delta\phi_o$ is an odd number multiple of $\pi$, its extinction ratio is maximized. These conditions are expressed by the following Equations 9 and 10.

$$(2\pi/\lambda)(\Delta n_o \times dp + \Delta n_{oa} \times da) = (2n+1)\pi \tag{9}$$

$$(2\pi/\lambda)(\Delta n_e \times dp + \Delta n_{ea} \times da) = 2m\pi \tag{10}$$

where n and m are arbitrary integers.

Especially, in a case where n=0 and m=0, the following Equations 11 and 12 are derived from the above-mentioned equations.

$$da = (\lambda/2)\{\Delta n_e/(\Delta n_e \Delta n_{oa} - \Delta n_o \Delta n_{ea})\} \tag{11}$$

$$dp = (\lambda/2)\{\Delta n_{ea}/(\Delta n_e \Delta n_{oa} - \Delta n_o \Delta n_{ea})\} \tag{12}$$

For example, in order to realize a polarized light separating element for light whose wavelength is 0.78 µm, the depth da of the groove 42 is set at 0.25 µm and the depth dp of the proton-exchanged layer 41 is set at 2.00 µm, in accordance with Equations 11 and 12.

As is apparent from the above description, when the polarization direction of the light beam 3 emitted from the light source 2 is set at the direction of extraordinary light with respect to the polarization anisotropic hologram 173, the diffraction does not arise in the outgoing path (the path toward the storage medium) and arises in the return path (the path after the storage medium), since The light beam 3 becomes ordinary light in the return path with its polarization direction being rotated by 90 degrees.

Since the proton-exchanged layers 41 are fabricated by the diffusion procedure, it is difficult to make the grating pitch equal to or less than 10 µm. However, in this example, the polarization anisotropic hologram 173 is located in the vicinity of the objective lens 4, far away from the photodetective sections 74a and 74b. Because of this, there is no need to design the grating pitch equal to or less than 10 µm, and thus the polarization anisotropic hologram 173 can be easily fabricated. As a result, a higher extinction ratio can be obtained and light can be used with a higher efficiency. Moreover, a signal whose amplitude is large and without noise caused by unnecessary diffracted light and therefore with an extremely high S/N ratio can be obtained. For this purpose, it is preferable that the distance between the polarization anisotropic hologram 173 and the objective lens 4 is shorter than about 15 mm. More preferably, this distance is shorter than about 8 mm so as to make the optical head device thin in the case of integrally providing The polarization anisotropic hologram 173 and the objective lens 4.

Furthermore, by locating the polarization anisotropic hologram 173 in the vicinity of the objective lens 4, an effective aperture R1 of the polarization anisotropic hologram 173 can be made larger also in a finite optical system. This makes it less restrictive and a wider range of the positional error of the position of the polarization anisotropic hologram 173 at the time of assembly results in the reduction of assembly costs of the optical head device.

The polarization anisotropic hologram 173 is not limited to a hologram using the lithium niobate, a liquid crystal cell or the like may be used, for example.

Supporting Member

It is desirable that the polarization anisotropic hologram 173, the quarter-wave plate 15 and the objective lens 4 are integrally supported as one unit by the supporting member 13, and a specified positional relationship is kept therebetween. Such a configuration allows the polarization anisotropic hologram 173 to move integrally with the objective lens 4 even when the objective lens 4 moves for a tracking control, so that the light beam reflected from the information storage medium 5 scarcely changes its position on the polarization anisotropic hologram 173. Accordingly, regardless of the movement of the objective lens 4 a Signal obtained from the photodetector 7 does not deteriorate. This effect will be described in detail later.

Configuration of Photodetector and Light Source

Figure 3:
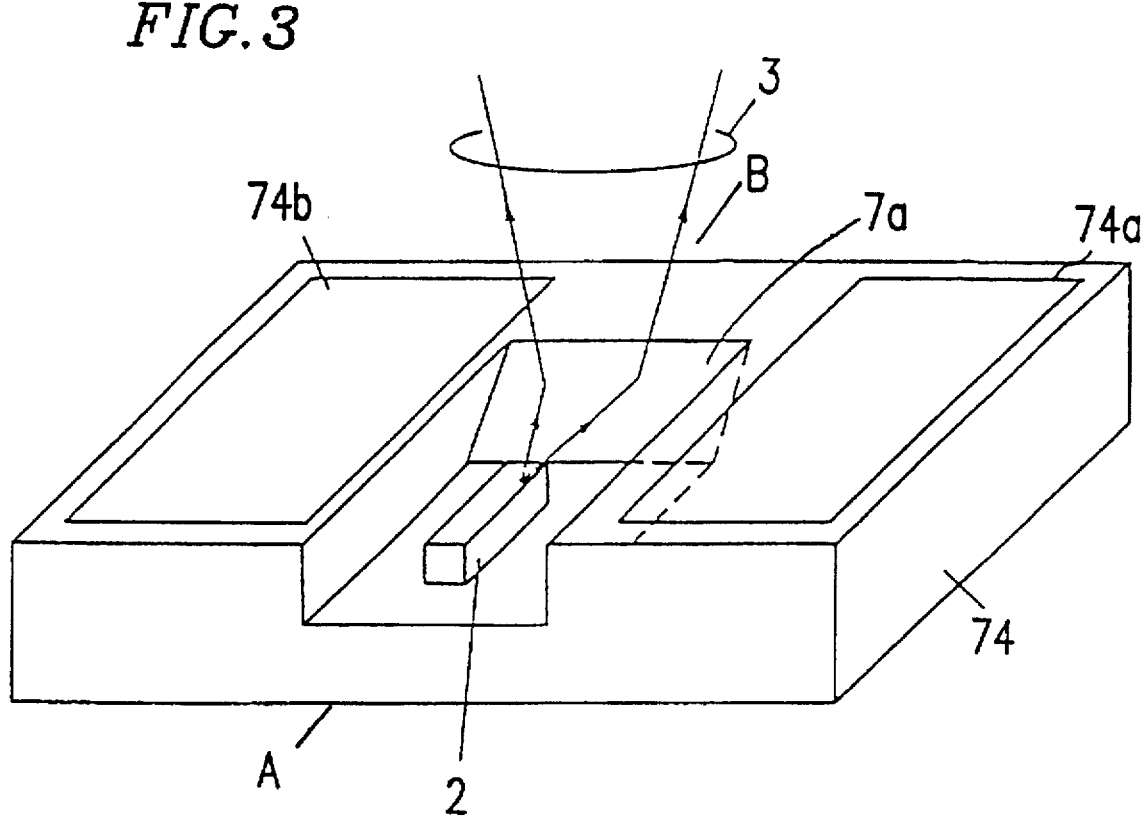
FIG. 3 is a perspective view showing a hybrid device incorporating a light source and a photodetector of the first example of the present invention.

FIG. 3 shows an exemplary configuration of the photodetector and the light source shown in FIG. 1. A device shown in FIG. 3 is a hybrid device in which the photodetective sections 74a, 74b and the light source 2 are located integrally as one unit on a photodetector substrate. Specifically, a concave portion (notch portion) is disposed between the photodetective sections 74a and 74b. The light source 2 is disposed on the bottom of the concave portion, and a mirror 7a is disposed on the side wall slope of the concave portion. The mirror 7a changes the direction of the laser beam emitted from the light source 2 into a predetermined direction.

By employing such a configuration, the photodetective sections 74a and 74b can be integrally formed as one unit using a semiconductor fabrication method. By using the semiconductor fabrication method, a positional relationship between the photodetective sections 74a and 74b can be precisely set at a set value in the μm order.

Each of the structural components of the hybrid device shown in FIG. 3 is electrically connected to an outside circuit through a wiring connection. In this example, all the directions of these connections are along the x-y plane shown in FIG. 3. Since each of the connections is brought close to each of the components along one common direction, an automatic assembly thereof is easily made. In addition, it suffices to set the reference line at the time of assembly only on the x-y plane, the positional relationship between the photodetective sections 74a, 74b and the light source 2 can be easily determined with high accuracy.

Detection of Focus Servo Signal

The method of detecting the focus servo signal in this example will be described hereinafter.

Figure 4A:
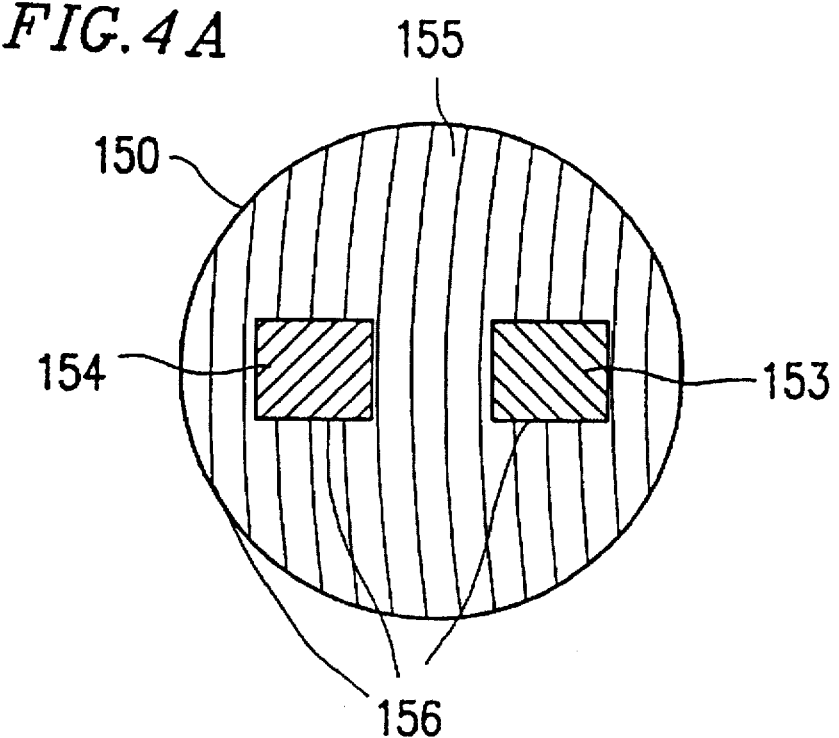
FIG. 4A is a plan view showing a hologram pattern of the polarization anisotropic hologram of the first example of the present invention.

As shown in FIG. 4A, the face of the polarization anisotropic hologram 173 on which the hologram pattern 150 is formed is divided into a plurality of areas, i.e., divisional areas 153, 154 and 155 and the like. The divisional area 155 is an area in which diffracted light for detecting a focus error signal is generated.

In this example, the spot size detection method (SSD method) is employed as a focus signal detection method. As disclosed by the Japanese Laid-Open Patent Publication No. 2-185722, the SSD method makes it possible to considerably increase the allowable errors of the assembly of the optical head device and to stably obtain the servo signal even against the wavelength fluctuations. This SSD method uses diffracted light which has the focal point in the front or rear of the reference plane (detection faces of the photodetective sections 74a and 74b).

Figure 4B:
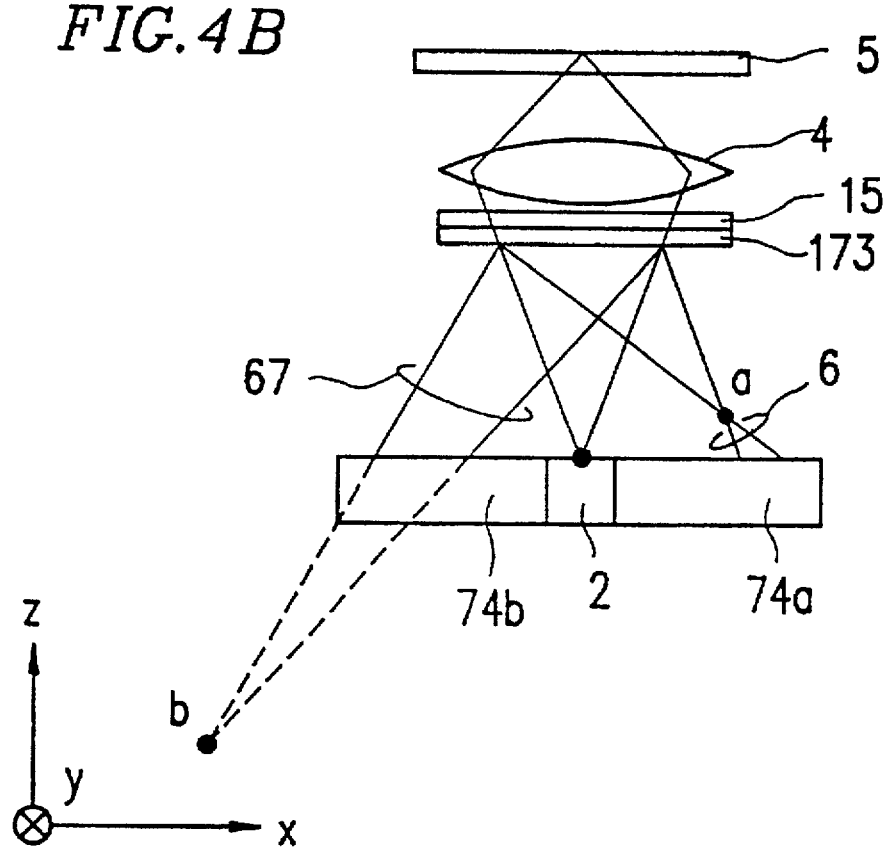
FIG. 4B is a schematic diagram showing focal points of diffracted lights.

The diffracted light for focus error signal detection generating area 155 can be designed so as to form two diffracted lights with different focal point positions, by using an off-axis Fresnel zone plate or the interference fringes of two spherical waves with different focal point positions. FIG. 4B shows diffracted lights having the focal points at the positions a and b in the front or rear of the reference plane (detection faces of the photodetective sections 74a and 74b). FIG. 5 shows the states of the diffracted light on the photodetector, formed by thus designed focus error signal detection generating area 155. FIG. 5B shows the diffracted light on the photodetector at the time of just focus, and FIGS. 5A and 5C show the diffracted light on the photodetector at the time of defocus.

The focus error signal FE is expressed by the following Equation 13:

$$FE=(S1+S3-S2)-(S4+S6-S5) \qquad (13)$$

If the polarization anisotropic hologram 173, the quarter-wave plate 15 end the objective lens 4 are supported e.g., by the supporting member 13 with the specified positional relationship kept among them, the light beam reflected from the information storage medium 5 scarcely changes its position on the polarization anisotropic hologram 173 even if the objective lens 4 moves. This is because the polarization anisotropic hologram 173 moves integrally with the objective lens 4. As a result, regardless of the movement of the objective lens 4, the diffracted light on the photodetective sections 74 does not move. Thus a signal obtained from the photodetective sections 74 does not deteriorate. Accordingly, the focus error signal can be stably obtained.

Detection of Tracking Error Signal

Figure 6:
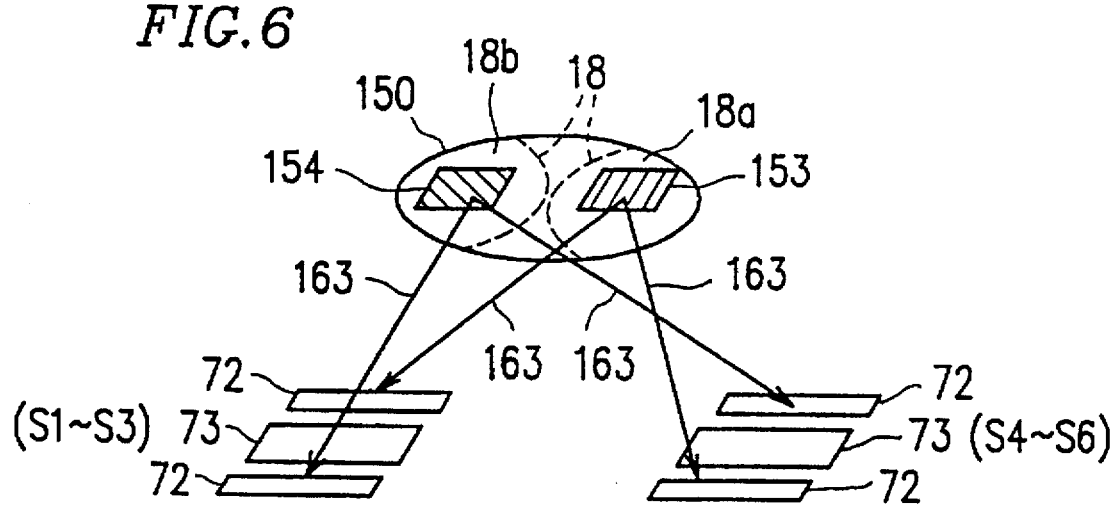
FIG. 6 is a schematic perspective view showing a method of detecting a tracking error signal.
Figure 7:
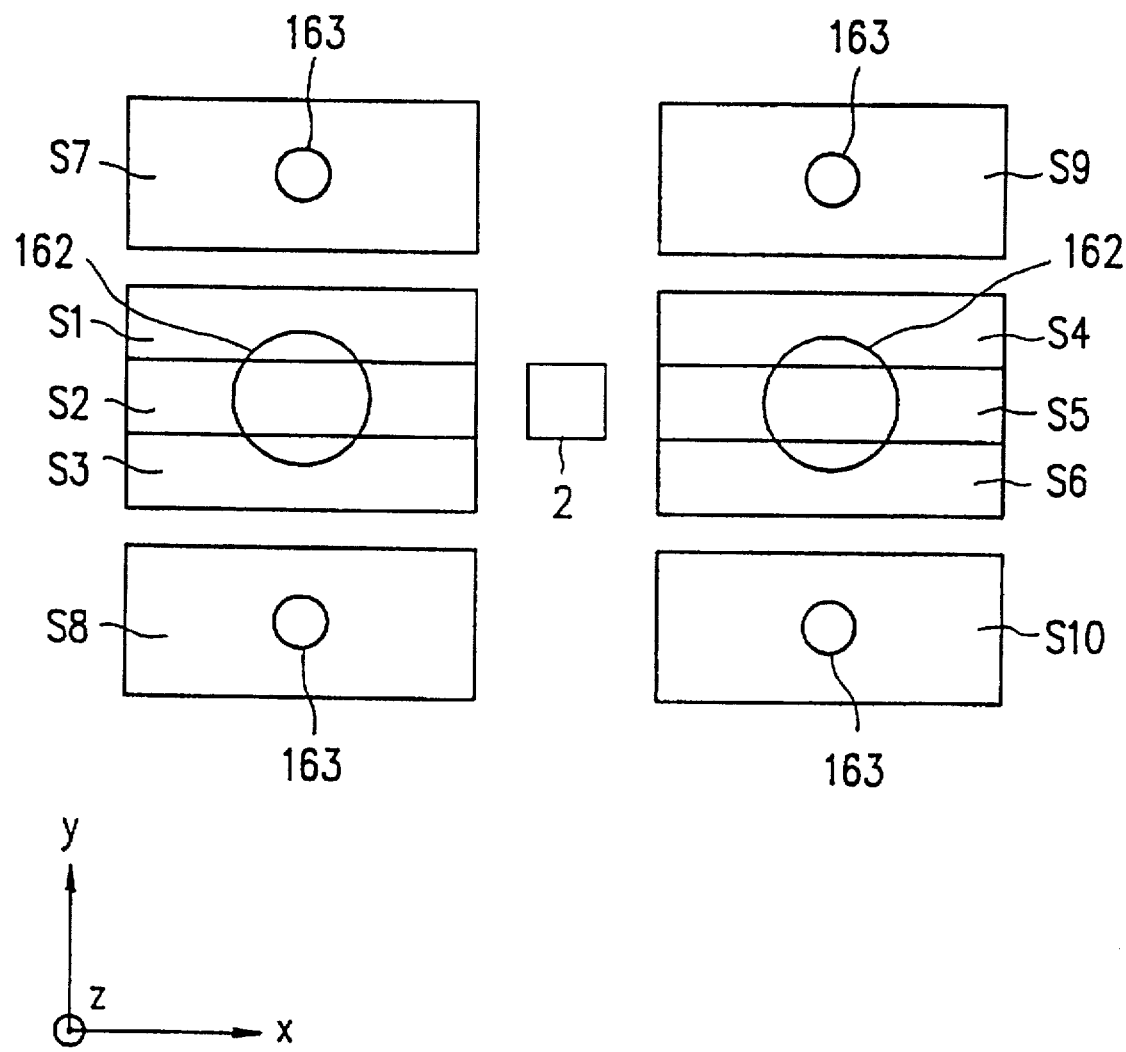
FIG. 7 is a plan view showing the diffracted lights incident upon photodetective sections of a second example of the invention.

Each of the divisional areas 153 and 154 shown in FIG. 4A is an area in which diffracted light for detecting a tracking error signal is generated. FIG. 6 is a view for explaining the function of the divisional area 153 or 154. The change of the positional relationship between a focused beam spot and a tracking groove on the information storage medium 5 varies the amount of light distribution of the reflected light on the polarization anisotropic hologram 173. By employing the configuration shown in FIG. 6, this variance of the amount of light distribution can be picked up as a tracking error signal TE. With reference to FIG. 6, the method of detecting the tracking error signal is described hereinafter.

The y-direction in FIG. 6 is in accordance with the track direction, i.e., so-called tangential direction of the information storage medium 5. The lights (for detecting the tracking error signal) 163 diffracted by the diffraction areas 153 and 154 are received by tracking error signal detection photodetective sections 72 (S7–S10 in FIG. 7). The tracking error signal is obtained by the calculation represented by following Equations 14 and 15.

$$TE=S7-S8 \qquad (14)$$

or $$TE=(S7+S10)-(S8+S9) \qquad (15)$$

If the polarization anisotropic hologram 173, the quarter-wave plate 15 and the objective lens 4 are supported e.g., by the supporting member 13 with the specified positional relationship kept among them, the light beam reflected from the information storage medium 5 scarcely changes its position on the polarization anisotropic hologram 173 even if the objective lens 4 moves. This is because the polarization anisotropic hologram 173 moves integrally with the objective lens 4. As a result, regardless of the movement of the objective lens 4, the diffracted light on the photodetective section 72 does not move. Thus the diffracted light for detecting the tracking error signal can be obtained from specific places on the far field pattern of the light beam. This makes it possible to obtain a tracking error signal stably and without offset.

Figure 8:
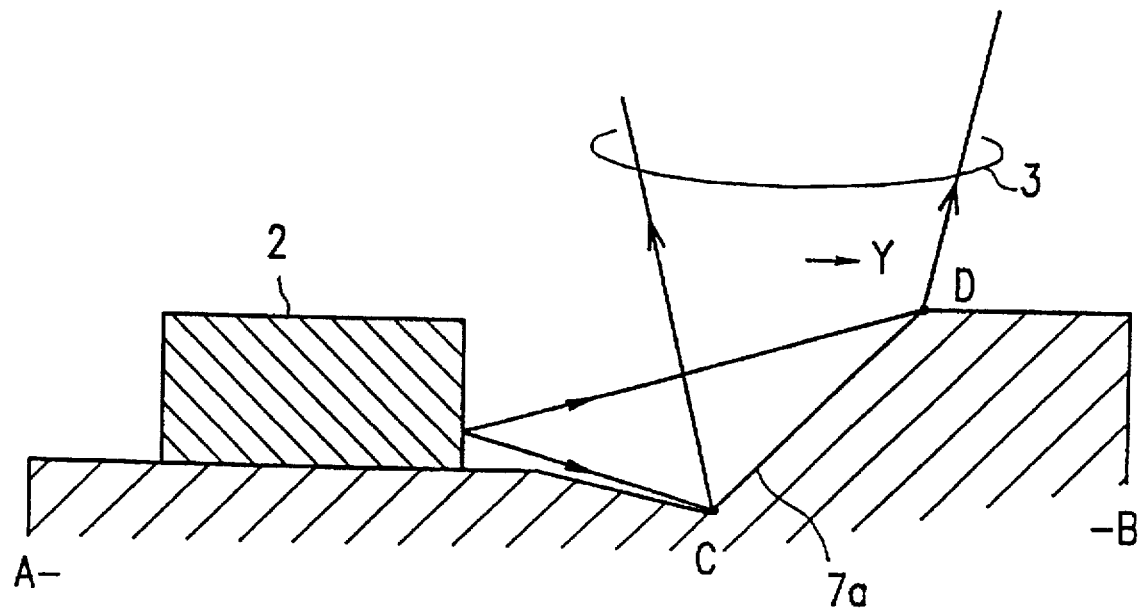
FIG. 8 is a cross-sectional view showing a section cut by a line A-B in FIG. 3.

Then, the exemplary configuration of the photodetector and the light source will be described in more detail, with reference to FIGS. 3 and 8. FIG. 8 is a cross-sectional view taken along the line A-B of FIG. 3.

As shown in FIG. 8, when being reflected by the mirror 7a, the light beam 3 passes through points C and D and diffracts in a plane parallel to the paper surface of FIG. 8. Because of this, the amount of the light beam 3 changes along the y-direction as shown by a graph inserted into FIG. 8. Accordingly, it is not desirable to divide a polarization anisotropic hologram pattern in the manner e.g., as shown by FIG. 6 and obtain the tracking error signal on the basis of the difference in diffracted light amount between one divisional area and another. This is because if the light beam 3 is divided in the y-direction an unbalance of the light amount is likely to occur, since the light amount distribution is disturbed along the y-direction.

Accordingly, in the case of obtaining the tracking error signal based on the difference in light amount between the diffracted light generated from the divisional area 153 and that generated from the divisional area 154 (i.e., employing Push-pull method), it is desirable to divide the light beam 3 in the x-direction of FIGS. 3 and 6. In other words, desirably, a line dividing between the divisional area 153 and 154 is made parallel to the y-direction and further in accordance with so-called tangential direction, i.e., the track direction (y-direction) of the information storage medium 5.

Figure 9:
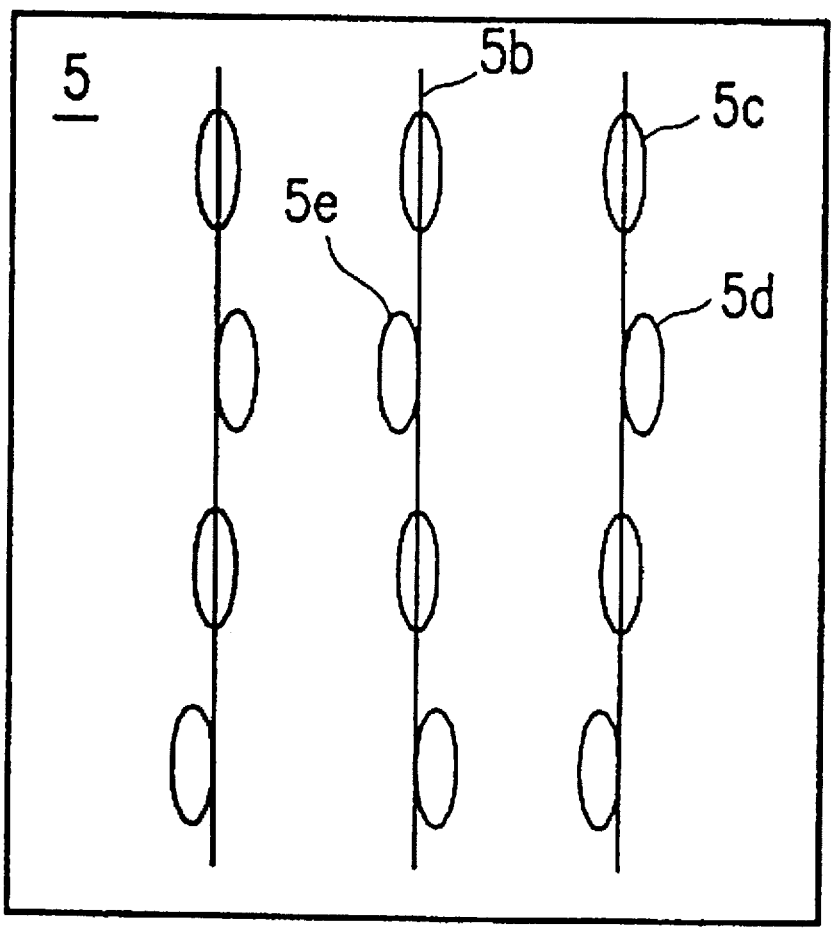
FIG. 9 is a schematic plane view showing an information storage medium in which wobble pits are formed.

Though the case of using the signal TE as a tracking error signal is described here, the signal TE can be used as other kinds of signal. FIG. 9 schematically shows the information storage medium 5 which has stored a wobble signal. In this information storage medium 5, pits 5e and 5d etc., are laterally shifted (i.e., wobbled) with respect to a track enter and the position of the pit indicates information (i.e., a wobble signal). The wobble signal stored in such an information storage medium 5 can be obtained in a similar manner to the above-mentioned case of obtaining the signal TE.

Also in the case of reproducing the wobble signal from the information storage medium 5, it is desirable that the polarization anisotropic hologram 173, the quarter-wave plate 15 and the objective lens 4 are supported e.g., by the supporting member 13 with the specified positional relationship being kept among them. If such an arrangement is adopted, the light beam reflected from the information storage medium 5 scarcely changes its position on the polarization anisotropic hologram 173 even if the objective lens 4 moves. This is because the polarization anisotropic hologram 173 moves integrally with the objective lens 4. As a result, regardless of the movement of the objective lens 4, the diffracted light on the photodetective section 72 does not move. Accordingly, the diffracted light for detecting the tracking error signal can be obtained from specific places on the far field pattern of the light beam. This makes it possible to obtain a wobble signal stably and without offset.

EXAMPLE 2

Figure 10:
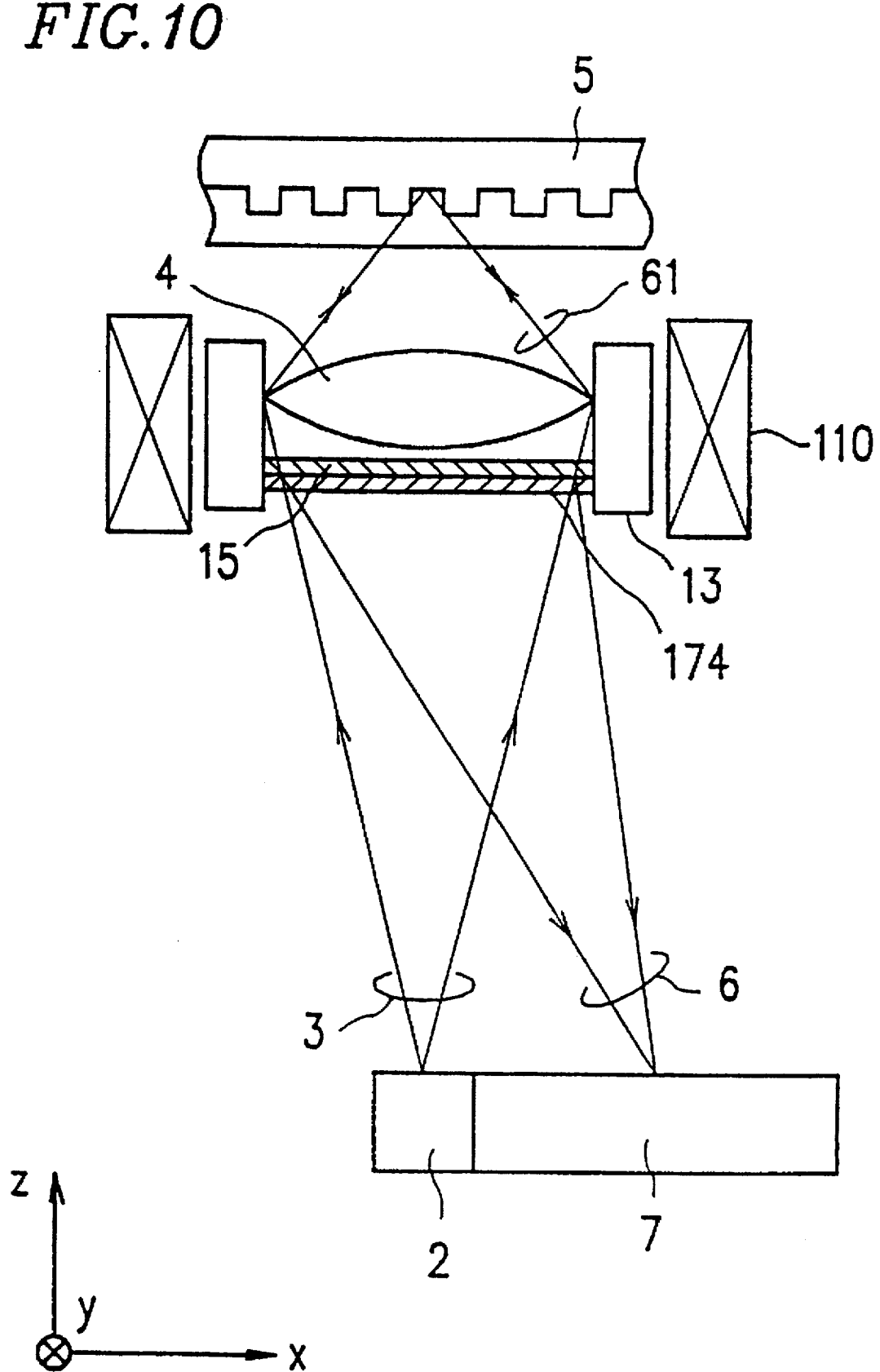
FIG. 10 is a schematic cross-sectional view showing an optical head device of the second example of the invention.

Another optical head device of the present invention will be described with reference to FIG. 10.

Figure 17A:
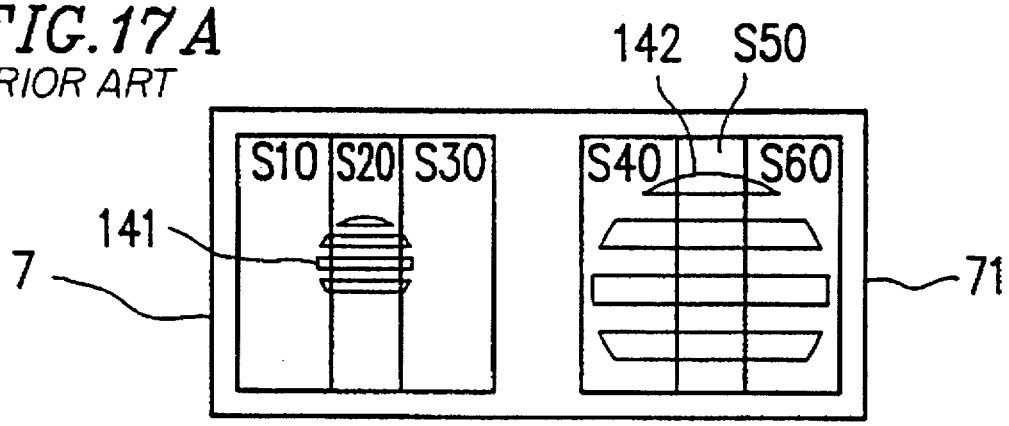
FIG. 17A through 17C are plan views showing the diffracted lights incident upon a photodetector of the conventional optical head device.
Figure 17B:
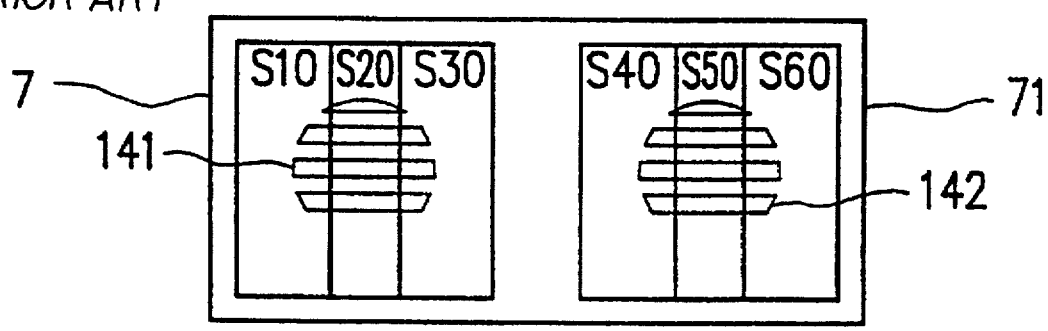
Figure 17C:
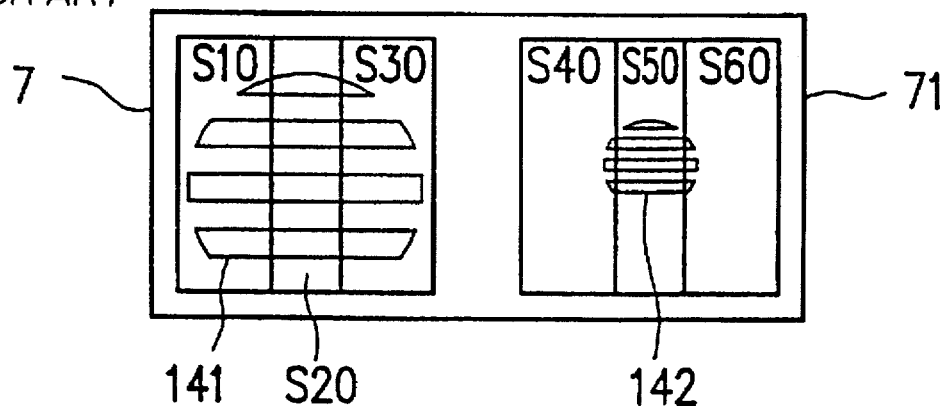
Figure 18:
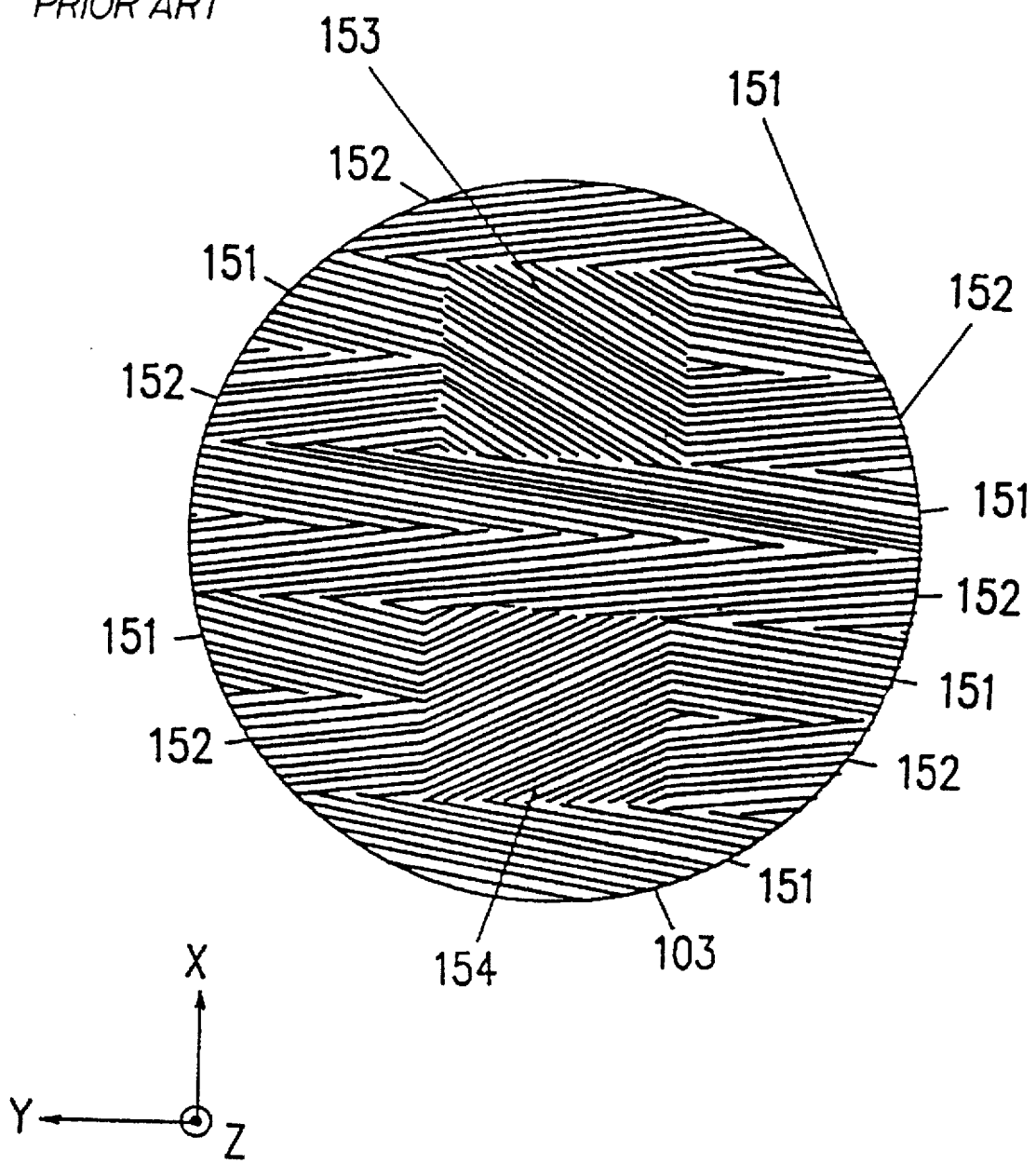
FIG. 18 is a plan view showing the hologram pattern of the conventional optical head device.
Figure 19:
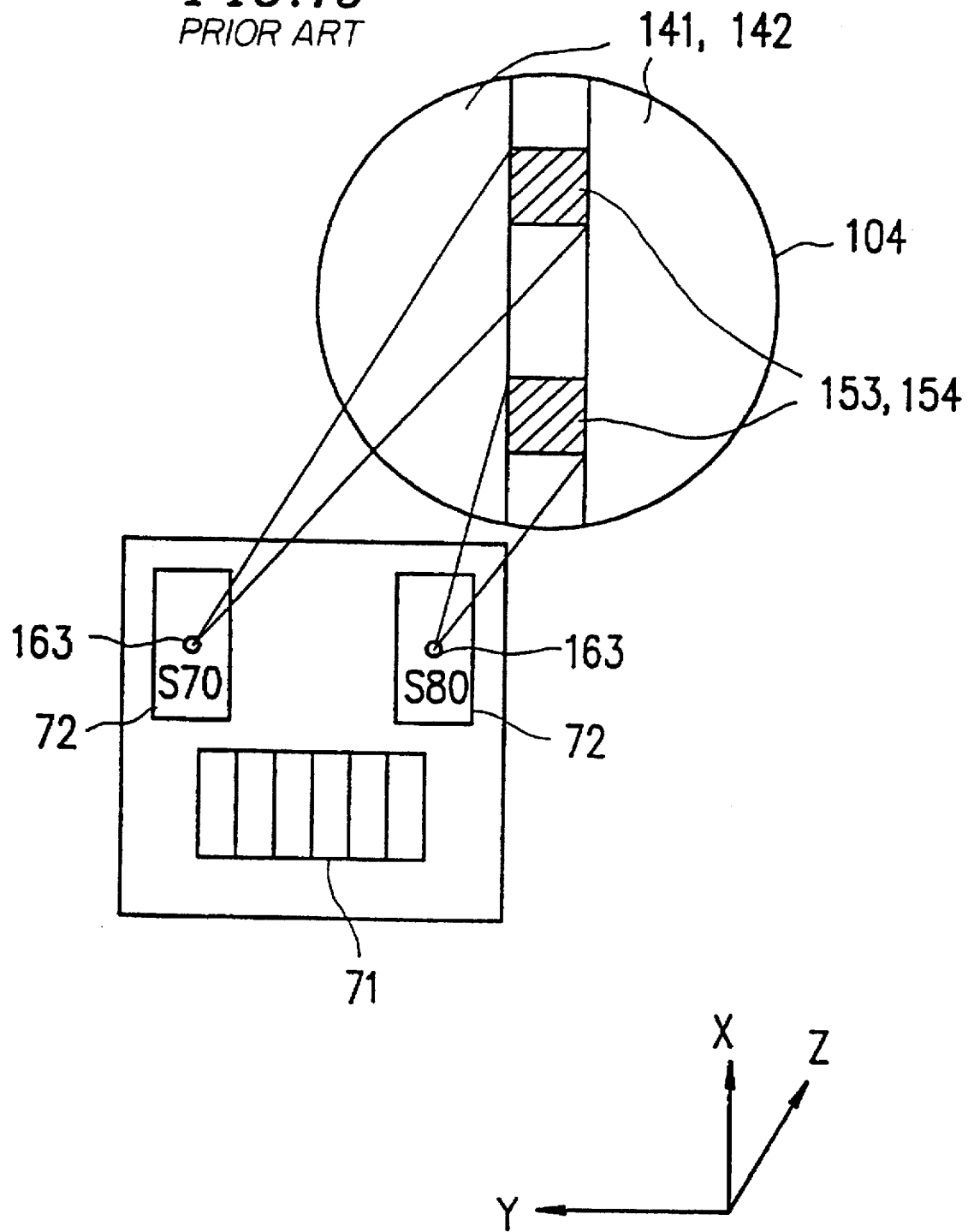
FIG. 19 is a schematic perspective view showing the main section of the conventional optical head.

A photodetector 7 has the configuration similar to that of the photodetector 71 shown in FIG. 17 and 19. The polarization anisotropic hologram pattern of a polarization anisotropic hologram 174 has the same configuration similar to that of the polarization anisotropic hologram 103 shown by FIG. 18. Apart from these points, the optical head device of Example 2 is structured in the same manner as Example 1.

In Example 2, the photodetector 7 is disposed only on one side of the light source 2. Because of this, a hybrid device combining the light source 2 and the photodetector 7 can be easily fabricated, which results in reduction of fabrication costs.

EXAMPLE 3

Figure 11:
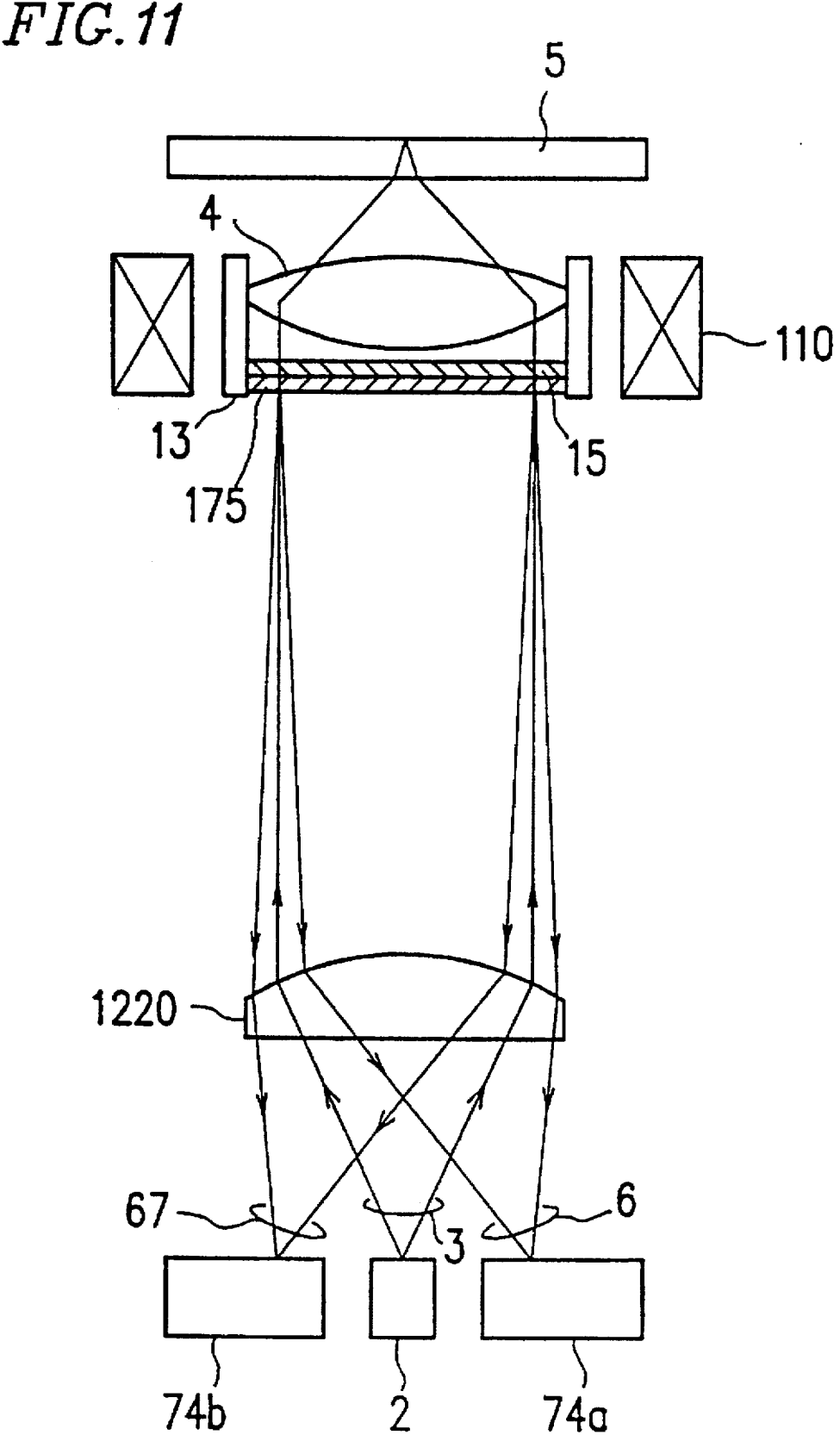
FIG. 11 is a schematic cross-sectional view showing an optical head device of a third example of the invention.

Still another optical head device of the present invention will be described with reference to FIG. 11. Though both above-mentioned Examples 1 and 2 employ a so-called finite optical system, this Example 3 employs an infinite optical system using a collimate lens 1220. Apart from this point, the configuration of the optical head device of Example 3 is similar to that of the device shown in FIG. 1.

In Example 3, the optical path length can be freely designed by using the collimate lens 1220.

EXAMPLE 4

Figure 12:
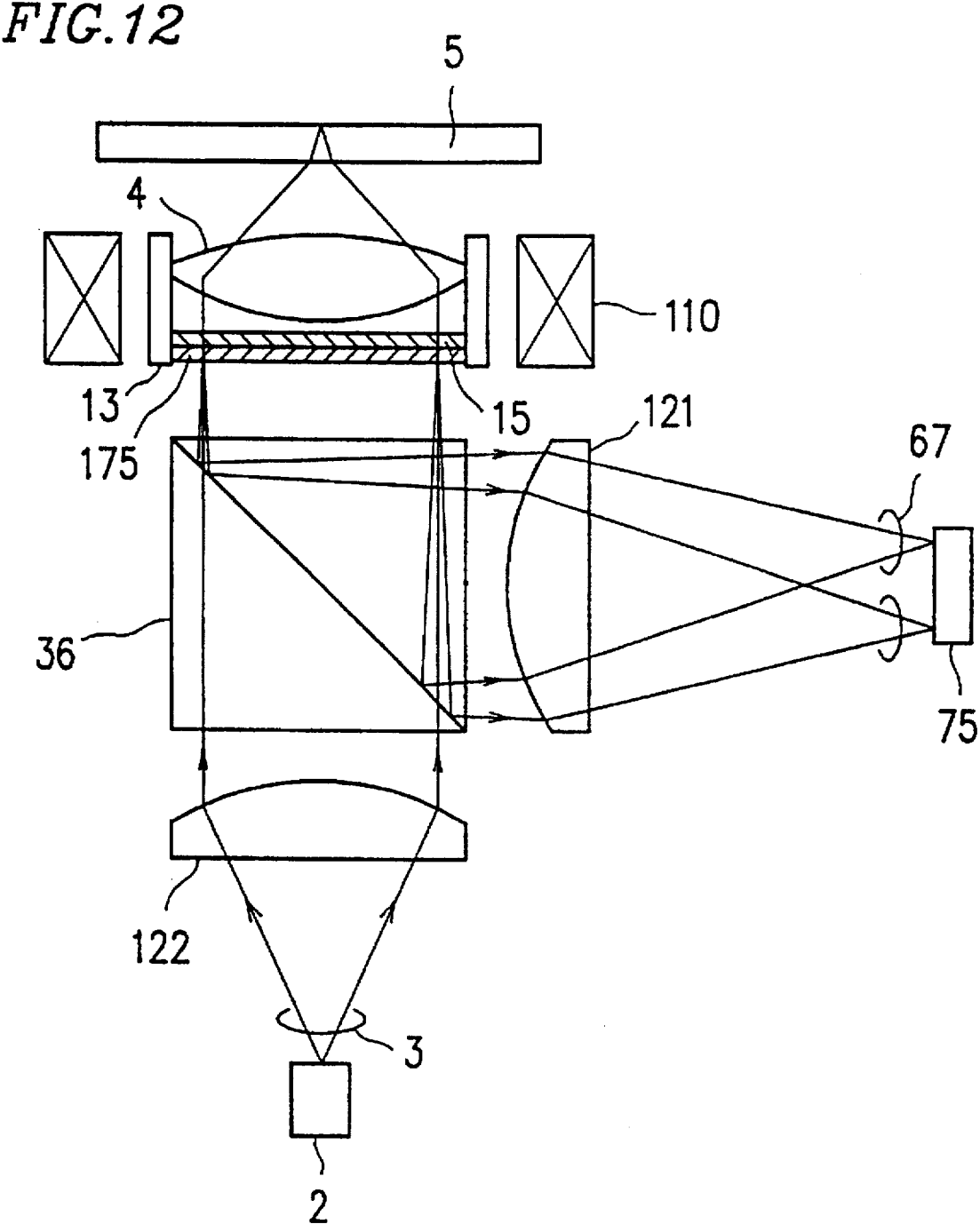
FIG. 12 is a schematic cross-sectional view showing an optical head device of a fourth example of the invention.

Still another optical head device of the present invention will be described with reference to FIG. 12.

A light beam 3 (laser beam) emitted from a light source 2 (semiconductor laser) is made approximately parallel light by means of a collimate lens B (122). Then, the light beam 3 passes through a beam splitter 36 and is incident upon a polarization anisotropic hologram 175, a quarter-wave plate 15 and an objective lens 4. Thereafter, the light beam 3 is converged on the information storage medium 5.

The light beam reflected by the information storage medium 5 and the diffracted light diffracted by the polarization anisotropic hologram 175 (not shown in FIG. 12) are reflected by the beam splitter 36 and then are converged by a collimate lens A (121), to be incident upon a photodetector 7. The output from the photodetector 7 is calculated whereby a servo signal (a focus error signal and a tracking error signal) and a data signal can be obtained.

In Example 4, the light beam 3 with a greater amount of light can be introduced within an effective aperture of the objective lens 4 by increasing the numerical aperture (NA) of the collimate lens B (122). Thus the light can be used with a higher efficiency. Moreover, the sensitivity of the focus error signal can be enhanced by reducing the numerical aperture (NA) of the collimate lens A (121) to make the longitudinal magnification for the objective lens 4 larger. Furthermore, a beam Shaping means such as a wedge-type prism or an anamorphic lens can be easily disposed between the light source 2 and the collimate lens B (122). The insertion of such a means allows to converge the light beam so that a focused beam spot on the information storage medium 5 becomes small.

Furthermore, the light can be used more efficiently by using a polarized beam splitter in place of the beam splitter 36. This allows a reduction in amount of return light to the light source 2, and makes the effect more prominent in that the occurrence of return light noise is avoided even when the semiconductor laser is used as the light source 2. In connection therewith, the inventors of the present invention point out in Japanese Laid-Open Patent Publication No. 63-241735 that the noise caused by return light can be reduced by inserting a polarization anisotropic hologram into the optical path system. According to the present invention, the polarization anisotropic hologram is inserted between the objective lens and the photodetector so as to be nearer to the objective lens than to the photodetector, and thereby fabrication/adjustment tolerance is enhanced. Furthermore, as described above, various problems are solved by providing the hologram and the lens integrally as one unit. That is, the polarization anisotropic hologram 175, the quarter-wave plate 15 and the objective lens 4 are supported e.g., by the supporting member 13 so that a specified positional relationship is kept among them. Because of this arrangement, the polarization anisotropic hologram 175 moves integrally with the objective lens 4 when the objective lens 4 moves for the purpose of tracking control. Thus, the light beam reflected from the information storage medium 5 scarcely changes its position on the polarization anisotropic hologram 175. Accordingly, regardless of the movement of the objective lens 4, the diffracted light on the photodetector 75 does not move either. Thus a signal obtained from the photodetector 7 does not deteriorate, and the focus error signal can be stably obtained. Moreover, as shown in FIG. 6, diffraction areas 153 and 154 are provided within the polarization anisotropic hologram pattern 150 so that the variance of light amount distribution on the polarization anisotropic hologram, caused by a change in the positional relationship between the focused beam spot and the track groove on the information storage medium 5, is picked up as the tracking error signal TE. Also, the polarization anisotropic hologram 175, the quarter-wave plate 15 and the objective lens 4 are structured so that a specified positional relationship is kept among them. Accordingly, the polarization anisotropic hologram 173 moves integrally with the objective lens 4 even when the objective lens 4 for the purpose of tracking control, and thus the diffracted light reflected from the information storage medium 5 scarcely changes its position on the polarization anisotropic hologram 175. Consequently, the diffracted light for detecting the tracking error signal can be obtained from specific places on the far field pattern of the light beam. This makes it possible to obtain the tracking error signal stably and without offset.

EXAMPLE 5

Figure 13:
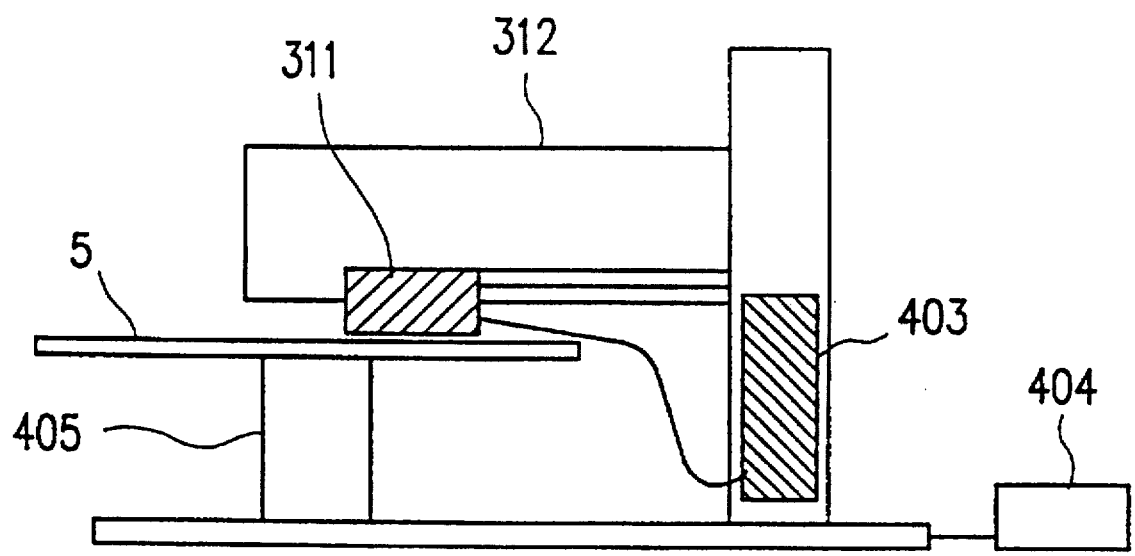
FIG. 13 is a schematic cross-sectional view showing an optical information apparatus according to the present invention.
Figure 14:
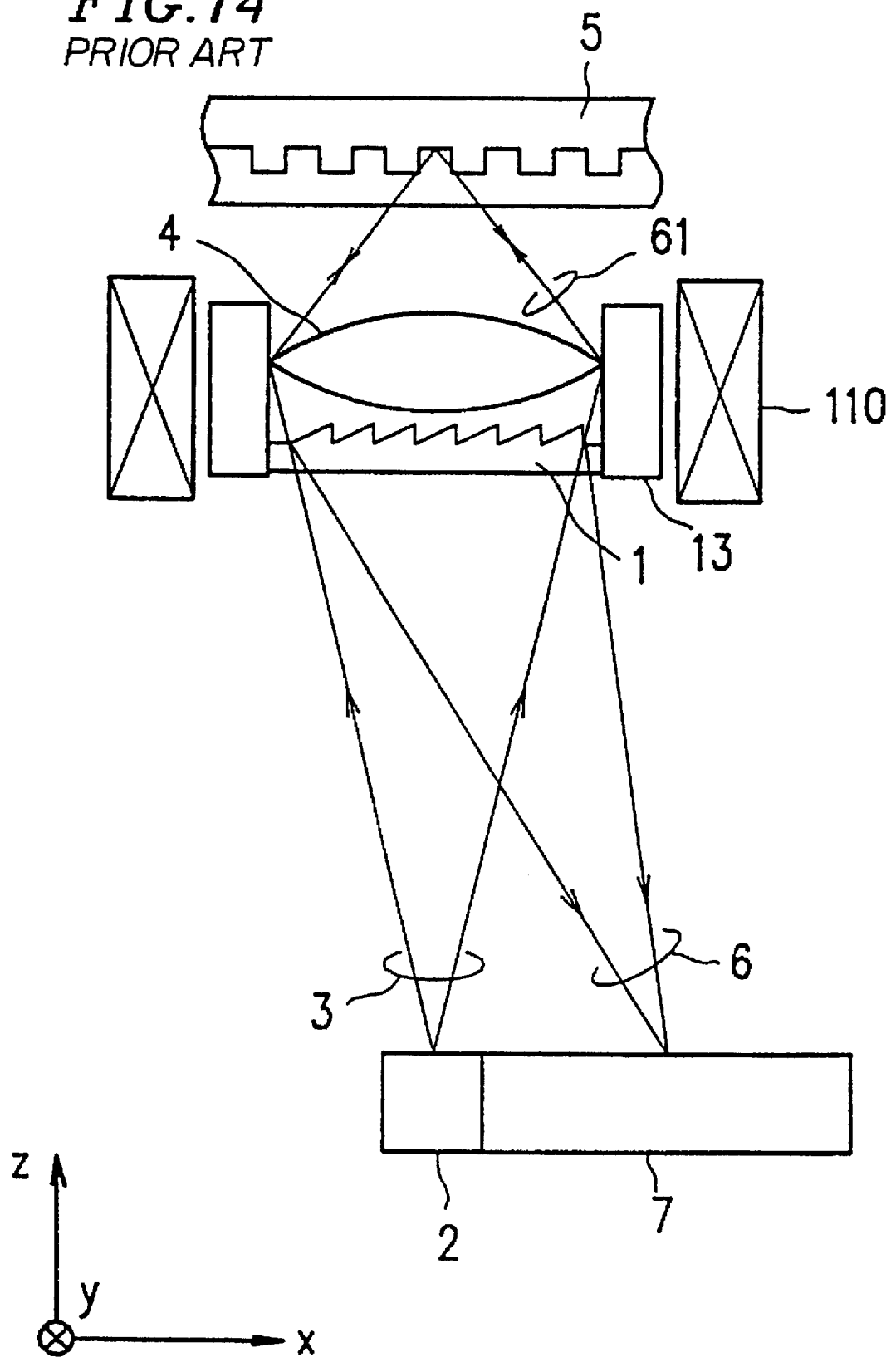
FIG. 14 is a schematic cross-sectional view showing a conventional optical head device.
Figure 15:
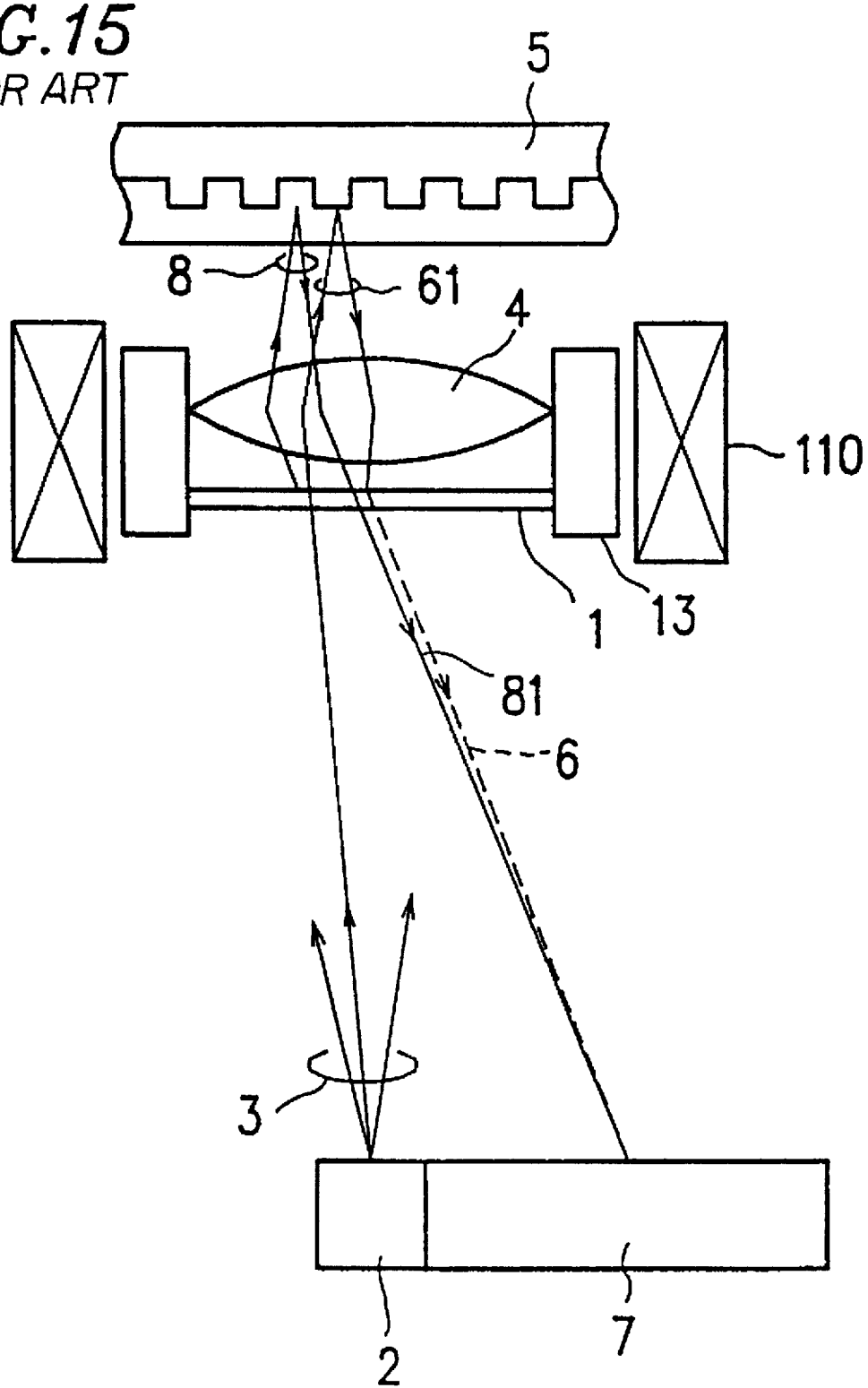
FIG. 15 is a schematic cross-sectional view showing another conventional optical head device.
Figure 16A:
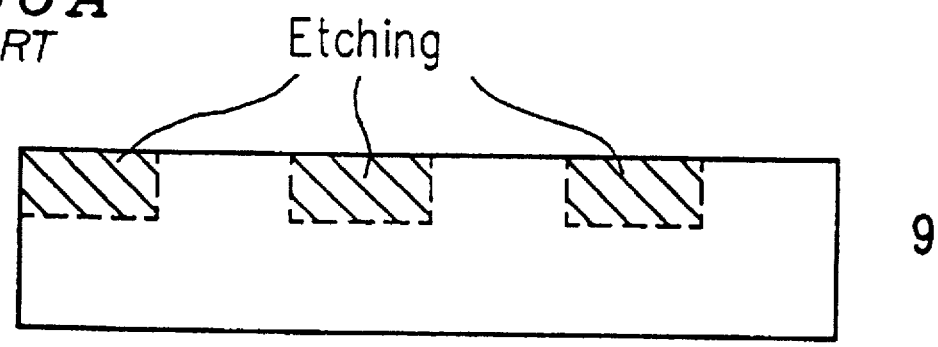
FIGS. 16A through 16C are schematic explanatory views showing an exemplary fabricating process of a blazed hologram.
Figure 16B:
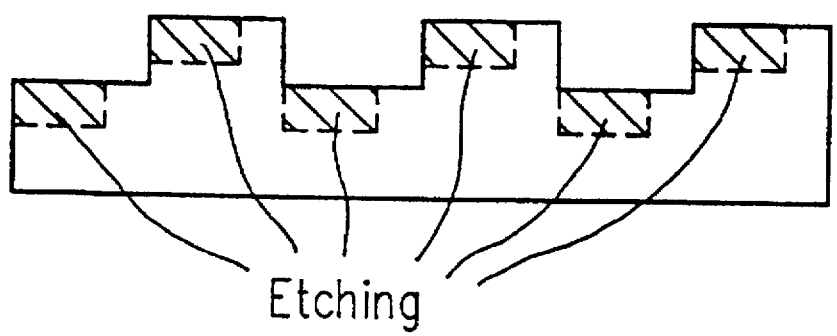
Figure 16C:
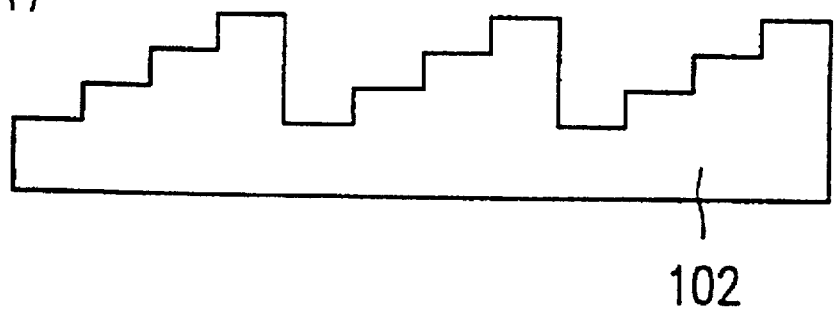

FIG. 13 shows an optical information apparatus using the optical head device according to the present invention.

In FIG. 13, the information storage medium 5 (optical disk) is rotated by an information storage medium drive mechanism 405. An optical head device 311 is coarsely moved by an optical head device drive device 312 to a track of the information storage medium 5 in which desired information exists. This optical head device drive device 312 also applies the focus error signal, the tracking error signal and the like to an electric circuit 403, correspondingly to the positional relationship with the information storage medium 5. In correspondence with this signal, the electric circuit 403 applies a signal for precisely moving the objective lens to the optical head device 311. The optical head device 311 performs the focus servo and the tracking servo for the information storage medium 5 by means of this signal, and conducts read/write or deletion of data to and from the information storage medium 5.

The optical information apparatus of Example 5 makes it possible to attain the effect that the data reproduction can be performed accurately and stably, since it uses the above described optical head device 311 which is an optical head device capable of obtaining a data signal with an excellent S/N ratio.

In addition, since the optical head device of the present invention is light and compact, the optical information apparatus of this example also has effects that the apparatus Is light and compact and the access time is short. Furthermore, the optical information apparatus of this example allows the detection of a very stable servo signal. Especially, even in the case where the position of the objective lens is different from a regular position, the stable servo signal which will not cause offset can be obtained. Accordingly, it has an effect that the data reproduction can be performed accurately and stably.

As is apparent from the above description, the following effects are obtainable from the present invention.

(1) Since the polarization anisotropic hologram and the optical element (a quarter-wave plate) for changing the polarization state are used in combination, an unnecessary diffraction does not occur on the outgoing path and a diffracted light beam for obtaining the servo signal or the like is generated on the return path. Accordingly, the device allows the obtaining of a signal with very high S/N ratio without noise due to unnecessary diffracted light beam.

(2) Since the polarization anisotropic hologram and the optical element (a quarter-wave plate) for changing the polarization state are used in combination, an unnecessary diffraction does not occur on the outgoing path and a diffracted light beam for obtaining the servo signal or the like is generated on the return path. Accordingly, the light can be used with a high efficiency and the amplitude of the signal is large. As a result, a signal with very high S/N ratio can be obtained.

(3) Since the proton-exchanged layer of the polarization anisotropic hologram is fabricated by the diffusion procedure, it is difficult to make the grating pitch equal to or less than 10 μm. However, in this invention, since the polarization anisotropic hologram is located in the vicinity of the objective lens, i.e., far away from the photodetector, the grating pitch can be designed to be equal to or more than 10 μm. Accordingly, the polarization anisotropic hologram can be easily fabricated, and a higher extinction ratio is easily realized at low costs.

(4) Since the high extinction ratio can be obtained, the light can be used with high efficiency and the amplitude of the signal is large. In addition thereto, the signal without noises due to unnecessary diffracted light and with very high S/N ratio can be obtained. Furthermore, since the first-order diffraction efficiency of the light beam on the return path is enhanced while the zero-order diffraction efficiency (transmittance) is about 0, the amount of return light to the light source can be minimized so as to be about 0. Accordingly, in the case of using a semiconductor laser as the light source, occurrence of the noise resulting from the return light can be prevented.

(5) Since the polarization anisotropic hologram is located in the vicinity of the objective lens, an effective aperture of the polarization anisotropic hologram can be made larger also in a finite optical system. Accordingly, allowable errors of the position of the polarization anisotropic hologram at the time of assembly can be greater, which results in the reduction of assembly costs of the optical head device.

(6) The polarization anisotropic hologram, the quarter-wave plate end the objective lens are supported e.g., by the supporting member so that a specified positional relationship is kept among them. Because of this arrangement, the polarization anisotropic hologram moves integrally with the objective lens, even if the objective lens moves for the purpose of tracking control. As a result, the light beam reflected from the information storage medium scarcely changes its position on the polarization anisotropic hologram. Accordingly, regardless of the movement of the objective lens, the diffracted light on the photodetector also does not move. In this way, a signal obtained from the photodetector does not deteriorate. Accordingly, the focus error signal can be stably obtained.

(7) By using the SSD method as a method of detecting the focus servo signal, the optical head device whose allowable errors at the time of assembly are further permitted can be constructed.

(8) The polarization anisotropic hologram, the quarter-wave plate and the objective lens are supported e.g., by the supporting member so that a specified positional relationship is kept among them. Because of this arrangement, the polarization anisotropic hologram moves integrally with the objective lens, even if the objective lens moves for the purpose of tracking control. As a result, the light beam reflected from the information storage medium scarcely changes its position on the polarization anisotropic hologram. Consequently, the diffracted light for detecting the tracking error signal (or wobble signal) can be obtained from specific places on the far field pattern of the light beam. This results in the effect that the tracking error signal or wobble signal can be stably obtained and without offset.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical head device comprising:

a light source for emitting a linear polarized light beam;

a single component objective lens for converging the light beam on an information storage medium;

a hologram for receiving the light beam reflected by the information storage medium and generating diffracted light from the light beam, the hologram having such a polarization anisotropy that diffracts light in a second polarization state more strongly than light in a first polarization state which is different from the second polarization state, the hologram allows the light in the first polarization state passing through the hologram substantially without generating diffracted light therefrom;

a photodetector including a plurality of photodetective sections for receiving a part of the diffracted light and outputting a photocurrent in accordance with the intensity of the part of the diffracted light; and a quarter wavelength plate, disposed between the hologram and the objective lens, for converting the linearly polarized light beam into a circular polarized light beam when the linearly polarized light beam travels from the light source to the information storage medium and, to the contrary, for returning the converted circular polarized light beam into a linearly polarized light beam in the second polarization state when the circular polarized light beam comes back from the information medium; wherein the hologram is disposed so that the distance between the hologram and the objective lens is shorter than the distance between the hologram and the photodetector;

the hologram has a lithium niobate substrate; wherein:

a hologram face of the hologram includes divisional areas H1 and H2;

the plurality of photodetective sections include a photodetector area P1 and photodetector area P2 which are provided on the detection face;

the photodetector area P1 receives diffracted light diffracted by the divisional area H1 of the hologram and outputs an output signal E1 in accordance with an intensity of the diffracted light;

the photodetector area P2 receives diffracted light diffracted by the divisional area H2 of the hologram and outputs an output signal E2 in accordance with an intensity of the diffracted light; and wherein a relative positional relationship between the hologram and the objective lens is fixed;

the hologram is integrated with the objective lens via a supporting member; and the hologram is disposed between the light source and the objective lens.

2. An optical head device according to claim 1, wherein the light source is a semiconductor laser.

3. An optical head device according to claim 1, wherein the hologram has proton-exchanged layers periodically formed on a surface of the substrate and grooves formed over upper portions of the proton-exchanged layers.

4. An optical head device according to claim 1, wherein the relative positional relationship among the hologram, the objective lens and the quarter wavelength plate is fixed.

5. An optical head device according to claim 1, wherein the diffracted light generated by the hologram includes a first spherical wave having a focal point before the detection face of the photodetector and a second spherical wave having a focal point beyond the detection face.

6. An optical head device according to claim 1, further comprising a substrate for holding the plurality of photodetective sections integrally as one unit, wherein;

the substrate provides a concave portion having a bottom and a side wall slope;

the light source is provided at the bottom of the concave portion; and a mirror for reflecting the light beam emitted from the light source in the direction perpendicular or substantially perpendicular to the surface of the substrate is provided on the side wall slope.

7. An optical head device according to claim 1, wherein the divisional areas H1 and H2 on the hologram face are symmetric with respect to a symmetry axis therebetween; and the symmetry axis coincides with track direction of the information storage medium.

8. An optical head device according to claim 7, wherein the divisional areas H1 and H2 on the hologram face are symmetric with respect to a symmetric axis therebetween; and both of the symmetry axis and the direction of the light beam traveling from the light source to the mirror coincide with track direction of the information storage medium.

9. An optical head device according to claim 1, further comprising a beam splitter for passing the light in the first polarization state and reflecting the light in the second polarization state, disposed between the light source and the hologram, wherein;

a part of the light beam reflected by the information storage medium is introduced through the beam splitter to the photodetector, after being diffracted by the hologram.

10. An optical head device in according to claim 1, further comprising a collimator lens disposed between the hologram and the radiation light source.

11. An optical information apparatus provided with an information storage medium drive means for driving an information storage medium, an optical head device and an optical head drive means for adjusting the positional relationship between the information storage medium and the optical head device, the optical head device comprising:

a light source for emitting a linear polarized light beam;

a single component objective lens for converging the light beam on an information storage medium;

a hologram for receiving the light beam reflected by the information storage medium and generating diffracted light from the light beam, the hologram having such a polarization anisotropy that diffracts light in a second polarization state more strongly than light in a first polarization state which is different from the second polarization state, the hologram allows the light in the first polarization state passing through the hologram substantially without generating diffracted light therefrom;

a photodetector including a plurality of photodetective sections for receiving a part of the diffracted light and outputting a photocurrent in accordance with the intensity of the part of the diffracted light; and a quarter wavelength plate, disposed between the hologram and the objective lens, for converting the linearly polarized light beam into a circular polarized light beam when the linearly polarized light beam travels from the light source to the information storage medium and, to the contrary, for returning the converted circular polarized light beam into a linearly polarized light beam in the second polarization state when the circular polarized light beam comes back from the information medium; wherein the hologram is disposed so that the distance between the hologram and the objective lens is shorter than the distance between the hologram and the photodetector;

the hologram has a lithium niobate substrate;

a hologram face of the hologram includes divisional areas H1 and H2;

the plurality of photodetective sections include a photodetector area P1 and a photodetector area P2 which are provided on the detection face;

the photodetector area P1 receives diffracted light diffracted by the divisional area H1 of the hologram and outputs an output signal E1 in accordance with an intensity of the diffracted light;

the photodetector area P2 receives diffracted light diffracted by the divisional area H2 of the hologram and outputs an output signal E2 in accordance with an intensity of the diffracted light; and wherein a relative positional relationship between the hologram and the objective lens is fixed;

the hologram is integrated with the objective lens via a supporting member; and the hologram is disposed between the light source and the objective lens a quarter wavelength plate, disposed between the hologram and the objective lens.

* * * * *

UNITED STATES PATENT AND TRADEMARK OFFICE
CERTIFICATE OF CORRECTION

PATENT NO.     : 5,687,153

DATED          : November 11, 1997

INVENTOR(S)    : Yoshiaki Komma et al.

It is certified that error appears in the above-identified patent and that said Letters Patent is hereby corrected as shown below:

Column 2, line 47, change "S4O" to --S40--.

Column 2, equation (1), change "FE = (S10 + S+ - S20) - (S40 + S60 - S50)" to --FE = (S10 + S30 - S20) - (S40 + S60 -S50)--.

Column 3, equation (2), change "TE - S70 - S80" to --TE = S70 - S80--.

Column 4, line 25, change "The" to --the--.

Column 9, line 1, change "Upon" to --upon--.

Column 12, line 23, change "The" to --the--.

Column 12, lines 43, change "The" to --the--.

Column 12, line 67, change "Signal" to --signal--.

Column 14, line 4, change "end" to --and--.

Column 16, line 35, change "Shaping" to --shaping--.

Column 17, line 55, change "Is" to --is--.

Column 18, line 46, change "end" to --and--.

UNITED STATES PATENT AND TRADEMARK OFFICE
CERTIFICATE OF CORRECTION

PATENT NO.      : 5,687,153

DATED           : November 11, 1997

INVENTOR(S)     : Yoshiaki Komma et al.

It is certified that error appears in the above-identified patent and that said Letters Patent is hereby corrected as shown below:

In The Claims:

Column 22, lines 22-23, after "objective lens" in line 56 delete --a quarter wavelength plate, disposed between the hologram and the objective lens--.

Signed and Sealed this

Seventeenth Day of February, 1998

Attest:

BRUCE LEHMAN

*Attesting Officer*            *Commissioner of Patents and Trademarks*